(12) United States Patent
Hunter

(10) Patent No.: US 12,518,093 B2
(45) Date of Patent: Jan. 6, 2026

(54) SYSTEM AND METHOD FOR WRITING ANALYSIS

(71) Applicant: Hunter IP Limited, Auckland (NZ)

(72) Inventor: Ian Charles Hunter, Hamilton (NZ)

(73) Assignee: Hunter IP Limited, Auckland (NZ)

( * ) Notice: Subject to any disclaimer, the term of this patent is extended or adjusted under 35 U.S.C. 154(b) by 336 days.

(21) Appl. No.: 18/233,540

(22) Filed: Aug. 14, 2023

(65) Prior Publication Data

US 2023/0419031 A1    Dec. 28, 2023

Related U.S. Application Data

(63) Continuation of application No. 16/620,709, filed as application No. PCT/NZ2018/050110 on Aug. 9, 2018, now abandoned.

(30) Foreign Application Priority Data

Jun. 9, 2017  (NZ) ........................................ 732733

(51) Int. Cl.
*G06F 40/253*    (2020.01)
*G06N 20/00*    (2019.01)
*G09B 7/02*    (2006.01)
*G09B 11/00*    (2006.01)

(52) U.S. Cl.
CPC ........... *G06F 40/253* (2020.01); *G06N 20/00* (2019.01); *G09B 7/02* (2013.01); *G09B 11/00* (2013.01)

(58) Field of Classification Search
CPC ........ G06F 40/253; G06N 20/00; G09B 7/02; G09B 11/00; G09B 19/00
See application file for complete search history.

(56) References Cited

U.S. PATENT DOCUMENTS

| | | | |
|---|---|---|---|
| 9,442,917 B2 | 9/2016 | Dou et al. | |
| 2005/0143971 A1 | 6/2005 | Burstein et al. | |
| 2006/0074659 A1* | 4/2006 | Adams | G10L 15/26 704/E15.045 |
| 2008/0293021 A1* | 11/2008 | Jang | G09B 5/065 434/157 |
| 2010/0169078 A1 | 7/2010 | Vanderwold et al. | |
| 2014/0108005 A1 | 4/2014 | Kassis et al. | |
| 2015/0019207 A1 | 1/2015 | Dou et al. | |
| 2015/0104763 A1* | 4/2015 | Hausmann | G06F 3/0481 434/169 |
| 2017/0220536 A1 | 8/2017 | Chiba et al. | |

* cited by examiner

*Primary Examiner* — Mark Villena
(74) *Attorney, Agent, or Firm* — GableGotwals

(57) ABSTRACT

At least one computer readable medium encoded with instructions that, when executed on a computer system, perform a method for determining one or more fluency characteristics of a writer from a piece of their prepared text and providing data to enable characterisation of the writer fluency. The method includes the steps of receiving text data carrying information on the piece of writing to be characterised; enumerating a set of sentences in the piece of writing, wherein each sentence is identified by applying a set of stored rules to the text data; determining a sentence type for each sentence within the piece of text by relating data carrying information on each sentence to stored rules and/or type data; aggregating a data set dependent on the sentence types identified and dependent on a defined aggregation operation; Characterisation data carrying information writer fluency measured dependent on the data set is generated.

14 Claims, 7 Drawing Sheets

✱✱✱———————————
◻◻◻———————————————————
XXX ——————————
! ! ! ! !
✱✱✱————————————✱✱✱
——————————————
——————————————
! ! ! ! !

1. Simple Sentence                          ————————————
2. Adverb Sentence                          XXX ——————————
3. Preposition Sentence                     ■■■——————————
4. W-Start Sentence                         W———————————
5. Explore the Subject Sentence             ✶✶✶——————✶✶✶
6. Very Short Sentence                      ! ! ! ! !
7. Em-Dash Sentence                         ————————✶✶✶————
8. Ing-Start Sentence                       ☐☐☐——————————
9. Ed-Start Sentence                        ⊠⊠⊠——————————
10. Serial comma (Red, White, and Blue)     ————◇————◇————◇
11. The Semi-Colon Sentence                 ○○○———————○○○
12. Question Sentence                       ??? ——————————
13. Power Sentence                          ✶✶✶——————————
14. Conjunction Sentence                    ◆◆◆——————————
15. Colon and Flow Sentence                 ●●●——————————
16. Emphatic Ending Sentence                ——————————✶✶✶
17. Developmental flow-on sentence          ——————————+++
18. Other Undefined Sentence                @@@ —————————
19. Incomplete Sentences                    ∀————————∀

SYSTEM AND METHOD FOR WRITING ANALYSIS

CROSS-REFERENCE TO RELATED APPLICATIONS

This United States application is a continuation application of U.S. Ser. No. 16/620,709 filed Dec. 9, 2019 which is the U.S. National Phase of PCT Application No. PCT/NZ2018/050110 filed 9 Aug. 2018 which claims priority to New Zealand Patent Application No. 732733 filed 9 Jun. 2017, each of which is incorporated herein by reference.

FIELD OF THE INVENTION

The invention relates to a system and method for analysis of writing and text, and in particular, a system and methods for writer style or ability analysis and for the provision of feedback which may be used to improve that style or ability.

DISCUSSION OF THE PRIOR ART

Writing ability is form of individual expression and an important indicator of the linguistic competency and knowledge of the writer. A piece of writing can be objectively relatively good or bad. Any two pieces of writing may also be good, but have a different style. Well known authors, for example, are known to exhibit a particular style of writing that can be identified as their own.

Existing approaches to writing analysis have focused on methods to evaluate essays or provide automatic grading systems for essays, often designed to assess written components of SATs or GMATs. Methods have typically focused around analysing essays for the presence or absence of key words, basic grammar or writing length, incidence of repetition, spelling, plagiarism, and punctuation. For example, a piece of writing may be assessed on factors such as sentence structure, vocabulary, punctuation, grammar, spelling, and structure. Yet feedback from the evaluator is typically based on a generalised combination of those factors or a focus on one particular area.

Sentence analysis in writing methods to date have used the four traditional measures of simple, compound, complex, and compound-complex. While technically accurate, these measures are too generic to understand a writer's skill or weakness, or make comparisons between writers or groups of writers, in a meaningful way for suggestions or improvement.

Improved systems and methods for writing style characterisation, evaluation and feedback are therefore desired.

It is an object of the invention to go at least some way toward overcoming or at least ameliorating the one or more of the above mentioned problems, or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In one broad aspect the invention consists in a method of determining one or more fluency characteristics of a writer from a piece of their prepared text and outputting feedback to enable characterisation of the writer fluency, the method comprising: receiving the piece of text prepared by the writer, wherein the text comprises a plurality of sentences; determining a sentence type for each sentence within the text by relating each sentence to stored rules and/or type data; aggregating a data set dependent on the sentence types identified and dependent on a defined aggregation operation; and generating characterisation data carrying information of writer fluency measured dependent on the data set.

In some embodiments, the list of sentence types consists in each of: Simple Sentence; Adverb Sentence; Preposition Sentence; W-Start Sentence; Explore the Subject Sentence; Very Short Sentence; Em-Dash Sentence; Ing-Start Sentence; Ed-Start Sentence; Serial comma sentence; The Semi-Colon Sentence; Question Sentence; Power Sentence; Conjunction Sentence; Colon and Flow Sentence; Emphatic Ending Sentence; Developmental flow-on sentence; Undefined Sentence; and Incomplete Sentences.

In some embodiments, determining a sentence type for each sentence within the text by relating each sentence to stored rules and/or type data comprises: applying one or more logic conditions and/or trained machine learning algorithms to the text and characters in a sentence in the text, a match occurring for a particular sentence type when the greatest number of logic conditions are met and/or has a highest probability determined for that sentence type.

In some embodiments, aggregating the data set comprises one or more of: summing the sentence types in the written piece; determining a ratio between two or more sentence types in use; determining a sequence or pattern of two or more sentence types used in the text; determining data comparing complete and incomplete sentence types used in the text; determining data comparing simple sentence types to all other sentence types; and/or determining the use of precision terms used in one or more sentences.

In some embodiments, characterisation data carrying information of writer fluency is determined by identification of successive use of a particular sentence type at least three times; and generating characterisation data carrying information of writer fluency measured dependent on the data set comprises generating an output indicative of the measure comprising at least one of: a visual identification of the repetition, and/or providing a selection of sentence types for substitution with at least one of the identified repeated sentence types.

In some embodiments, characterisation data carrying information of writer fluency is determined by: identifying the sentence types present and absent in the text; determining a level of difficulty associated with the absent sentence; and generating characterisation data carrying information of writer fluency measured dependent on the data set comprises a list of the absent sentence types as list ordered by the level of difficulty of the absent sentence types.

In some embodiments, characterisation data carrying information of writer fluency is determined by: identifying a selection of sentence types; Identifying the order and/or grouping of those sentence types in the selection; comparing the identified order and/or grouping to a predetermined selection of superior orders or groupings; determining at least one absent superior order or grouping; and generating characterisation data carrying information of writer fluency measured dependent on the data set comprises at least one absent superior orders or groupings.

In some embodiments, characterisation data carrying information of writer fluency is determined by: identifying a selection of sentence types; identifying the frequency of those sentence types; comparing the frequency to at least one predetermined superior or reference frequency; and generating characterisation data carrying information of writer fluency measured dependent on the data set comprises that frequency.

In some embodiments, characterisation data carrying information of writer fluency is determined by: identifying a selection of sentence types used by the writer; identifying the sentence type and order of those sentence types; comparing the type and order to the type and order of a reference text; and generating characterisation data carrying information of writer fluency measured dependent on the data set comprises a comparison of the type and order of the text and reference text.

In some embodiments, characterisation data carrying information of writer fluency is determined by: identifying a measure of either the rate of precision terms, or the density of precision terms, or both; and generating characterisation data carrying information of writer fluency measured dependent on the data set comprises the rate of precision terms and/or the density of precision terms.

In some embodiments, generating characterisation data carrying information of writer fluency measured dependent on the data set comprises one or more of: display of a fluency chart; identification of a particular sentence type that has been used successively three or more times; and/or identification of one or more sentence types that are not used, or least used in the text.

In some embodiments, characterisation data carrying information of writer fluency is determined by: identifying each sentence as a complete sentence or incomplete sentence, the incomplete sentence being the incomplete sentence type, and the complete sentence is any other sentence type; determining a ration of complete sentences to incomplete sentences; and generating characterisation data carrying information of writer fluency measured dependent on the data set comprises the ratio of complete to incomplete sentences.

In some embodiments, characterisation data carrying information of writer fluency is determined by: identifying the sequence of sentence types deployed in the text;

determining the use of the same sentence types above a threshold repetition frequency;

and generating characterisation data carrying information of writer fluency measured dependent on the data set comprises data indicative of sequential use of same sentence types.

In some embodiments, the threshold for each sentence type is:

| | |
|---|---|
| Simple Sentence; | 4 |
| Adverb Sentence; | 2 |
| Preposition Sentence; | 2 |
| W-Start Sentence; | 2 |
| Explore the Subject Sentence; | 2 |
| Very Short Sentence; | 3 |
| Em-Dash Sentence; | 2 |
| Ing-Start Sentence; | 1 |
| Ed-Start Sentence; | 2 |
| Serial comma (Red, White, and Blue); | 1 |
| The Semi-Colon Sentence; | 1 |
| Question Sentence; | 2 |
| Power Sentence; | 2 |
| Conjunction Sentence; | 1 |
| Colon and Flow Sentence; | 1 |
| Emphatic Ending Sentence; | 1 |
| Developmental flow-on sentence; | 1 |
| Undefined Sentence; and | 2 |
| Incomplete Sentences. | 1 |

In some embodiments, characterisation data carrying information of writer fluency is determined by: identifying one or more sentences absent of precision terms from a predetermined list of precision terms; and generating characterisation data carrying information of writer fluency measured dependent on the data set comprises data indicative of the sentences absent of precision terms.

In some embodiments, characterisation data carrying information of writer fluency is determined by: aggregating a ratio representing sentences with precisions terms and sentences absent of precision terms; comparing the ratio to a threshold; and generating characterisation data carrying information of writer fluency measured dependent on the data set comprises data indicative of the ratio being below the threshold.

In another broad aspect the invention consists in a system configured to determine one or more fluency characteristics of a writer from a piece of their prepared text and output feedback to enable characterisation of the writer fluency, the system comprising: a storage component configured to store processor executable instructions; and a processor configured to: receive the piece of text prepared by the writer, wherein the text comprises a plurality of sentences; determine a sentence type for each sentence within the text by relating each sentence to stored rules and/or type data; aggregate a data set dependent on the sentence types identified and dependent on a defined aggregation operation; and generate characterisation data carrying information of writer fluency measured dependent on the data set.

In another broad aspect the invention consists in at least one computer readable medium encoded with instructions that, when executed on a computer system, perform a method comprising acts of: receiving the piece of text prepared by the writer, wherein the text comprises a plurality of sentences; determining a sentence type for each sentence within the text by relating each sentence to stored rules and/or type data; aggregating a data set dependent on the sentence types identified and dependent on a defined aggregation operation; and generating characterisation data carrying information of writer fluency measured dependent on the data set.

In another broad aspect the invention consists in at least one computer readable medium encoded with instructions that, when executed on a computer system, perform a method comprising acts of: receiving text data carrying information on the piece of writing to be characterised; enumerating a set of sentences in the piece of writing, wherein each sentence is identified by applying a set of stored rules to the text data; determining a sentence type for each sentence within the piece of text by relating data carrying information on each sentence to stored rules and/or type data; aggregating a data set dependent on the sentence types identified and dependent on a defined aggregation operation; and generating characterisation data carrying information writer fluency measured dependent on the data set.

In another broad aspect the invention consists in at method of determining one or more fluency characteristics of a writer from a piece of their prepared text and outputting feedback to enable characterisation of the writer precision, the method comprising: receiving the piece of written text with a computer, wherein the text comprises a plurality of sentences; determining each sentence in the piece of written text; identifying, within each determined sentence, one or more words precision term from the database of precision terms; outputting data indicative of precision term use in the text and the precision characteristics of the writer.

In some embodiments, the precision terms comprise: actual names, dates, statistics, amounts, events, places, people, things, and including subject terminology.

In some embodiments, the method further comprises calculating the rate of precision term use as the number of sentences containing precision elements divided by the number of sentences identified in the text; and outputting data indicative of precision term use in the text and the precision characteristics of the writer comprises scoring the writer based on the calculated rate of precision term use.

In some embodiments, the method further comprises calculating the number of precision terms used per the number of words in the text, the calculation indicative of the density of precision term use; and outputting data indicative of precision term use in the text and the precision characteristics of the writer comprises scoring the writer based on the calculated density of precision term use.

In some embodiments, the method further comprises determining sentences where precision terms are absent; and outputting data indicative of the sentences where precision terms are absent.

In some embodiments, the method further comprises calculating the ratio of sentences with precision terms to the sentences without precision terms; and outputting data indicative of precision term use in the text and the precision characteristics of the writer comprises scoring the writer based on the ratio, and/or generating a warning when the ratio is below the threshold, the threshold dependent on one or more characteristics of the writer, including age and/or writing skill level and/or previous work by the writer.

In some embodiments, the method further comprises determining whether a sentence has a word count exceeding a desired threshold, and outputting feedback to the writer when that threshold is exceed; and wherein the threshold is dependent on whether or not at least one precision term has been identified.

In another broad aspect the invention consists in a system configured to determine one or more fluency characteristics of a writer from a piece of their prepared text and output feedback to enable characterisation of the writer fluency, the system comprising: a storage component configured to store processor executable instructions; and a processor configured to: receive the piece of written text with a computer, wherein the text comprises a plurality of sentences; determine each sentence in the piece of written text; identify, within each determined sentence, one or more words precision term from the database of precision terms; output data indicative of precision term use in the text and the precision characteristics of the writer.

In another broad aspect the invention consists in at least one computer readable medium encoded with instructions that, when executed on a computer system, perform a method for automatically generating text, the method comprising acts of: receiving the piece of written text with a computer, wherein the text comprises a plurality of sentences; determining each sentence in the piece of written text; identifying, within each determined sentence, one or more words precision term from the database of precision terms; outputting data indicative of precision term use in the text and the precision characteristics of the writer.

In another broad aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text, wherein the text comprises a plurality of sentences; determine each sentence in the piece of written text; match each determined sentence with a sentence type from a list of predetermined sentence types to thereby determine the sentence types within the text; aggregate a data set based according to determined sentence types; determine a measure of the writer's fluency characteristics based on the aggregated data; and output feedback based on the determined measure.

In another aspect the invention consists in a method of determining one or more fluency characteristics of a writer from a piece of written text and outputting feedback to improve one or more of the writer fluency characteristics, the method comprising: receiving the piece of written text with a computer, wherein the text comprises a plurality of sentences; determining each sentence in the piece of written text; matching each determined sentence with a sentence type from a list of predetermined sentence types to thereby determine the sentence types within the text; aggregating a data set based according to determined sentence types; determining a measure of the writer's fluency characteristics based on the aggregated data; and outputting feedback based on the determined measure.

In some embodiments, determining each sentence in the piece of written text is conducted by a parsing process.

In some embodiments, aggregating the data set comprises one or more of: summing the sentence types in the written piece; determining a ratio between two or more sentence types in use; determining a sequence or pattern of two or more sentence types used in the text; determining data comparing complete and incomplete sentence types used in the text; determining data comparing simple sentence types to all other sentence types; and determining the use of precision terms used in one or more sentences.

In some embodiments, outputting feedback based on the determined measure comprises one or more of: a fluency chart; a visual reference or tag to any particular sentences in the written piece that may benefit from change or redrafting; an indication that a particular sentence type has been used successively, such as three or more times; and an indication of sentence types that are not used, or not used prolifically in the piece of writing.

In some embodiments, the piece of written text comprises two or more sentences.

In some embodiments, the method further comprises: characterising each determined sentence as a complete or incomplete sentence; wherein an incomplete sentence is the incomplete sentence type, and a complete sentence is any other sentence.

In some embodiments, the method further comprises: aggregating the sentences characterised as either complete or incomplete sentences; and outputting feedback to the writer based on the aggregated complete or incomplete sentences data.

In some embodiments, the method further comprises: determining pattern data from the matched sentence types, the pattern data indicative of the sequence of sentence types deployed in the text; determining sequential use of same sentence types; and outputting data indicative of sequential use of same sentence types.

Preferably the method further comprises: determining pattern data from the matched sentence types, the pattern data indicative of the sequence of sentence types deployed in the text; and outputting data based on an improved sequence of sentence types.

In some embodiments, the method further comprises: determining simple and other sentences type data from the matched sentence types, the simple and other sentences data indicative of the simple and other sentences deployed in the text.

In some embodiments, the method further comprises: storing a plurality of precision terms in a database; determining, within each sentence determined sentence, one or more words containing precision terms from the precision terms in the database; matching the text in each sentence sentences where precision terms are not present; and outputting data indicative of the sentences where precision terms are not present.

In some embodiments, the method further comprises aggregating a ratio representing sentences with precisions terms and sentences without precision terms; and outputting a notification to the writer when the ratio is below a threshold.

In some embodiments, the method further comprises receiving demographic information pertaining to the writer, and the data is output based on the demographic data.

In another aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text, wherein the text comprises a plurality of sentences; determining each sentence in the piece of written text; characterise each determined sentence as a complete or incomplete sentence; aggregate data relating to the characterised sentences; and output feedback to the writer based on the aggregated data.

In another aspect the invention consists in a method of determining fluency characteristics of a writer from a piece of written text, the method comprising: receiving the piece of written text with a computer, wherein the text comprises a plurality of sentences; determining each sentence in the piece of written text; characterising each determined sentence as a complete or incomplete sentence; aggregating data relating to the characterised sentences; and outputting feedback to the writer based on the aggregated data.

In another aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text, wherein the text comprises a plurality of sentences; determine each sentence in the piece of written text; match each determined sentence with a sentence type from a list of predetermined sentence types; determine pattern data from the determined sentence types, the pattern data indicative of the sequence of sentence types deployed in the text; compare the sequence of sentence types deployed to predetermined repetition tolerance threshold list; and output a form of feedback when the threshold is exceeded for any sentence type.

In another aspect the invention consists in a method of determining fluency characteristics of a writer from a piece of written text, the method comprising: receiving the piece of written text with a computer, wherein the text comprises a plurality of sentences; determining each sentence in the piece of written text; matching each determined sentence with a sentence type from a list of predetermined sentence types; determining pattern data from the determined sentence types, the pattern data indicative of the sequence of sentence types deployed in the text; comparing the sequence of sentence types deployed to predetermined repetition tolerance threshold list; and outputting a form of feedback when the threshold is exceeded for any sentence type.

In some embodiments, the method further comprises: determining pattern data from the matched sentence types, the pattern data indicative of the sequence of sentence types deployed in the text; and outputting data based on an improved sequence of sentence types.

In some embodiments, the form of feedback is a directive to change a sequence of sentence types exceeding the threshold to a sequence of sentence types that do not exceed the threshold.

In another aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text with a computer, wherein the text comprises a plurality of sentences; determine each sentence in the piece of written text; determine simple and all other sentence data from the determined sentences, aggregate the simple and all other sentences data; and output feedback based on the aggregated simple and all other sentences data.

In another aspect the invention consists in a method of determining fluency characteristics of a writer from a piece of written text, the method comprising: receiving the piece of written text with a computer, wherein the text comprises a plurality of sentences; determining each sentence in the piece of written text; determining simple and all other sentence data from the determined sentences, aggregating the simple and all other sentences data; and outputting feedback based on the aggregated simple and all other sentences data.

In another aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text with a computer, wherein the text comprises a plurality of sentences; determine each sentence in the piece of written text; identify, within each determined sentence, one or more words precision term from the database of precision terms; output data indicative of precision term use in the text and the precision characteristics of the writer.

In another aspect the invention consists in a method of determining precision characteristics of a writer from a piece of written text, the computer configured to store plurality of precision terms in a database of precision terms, the method comprising: receiving the piece of written text with a computer, wherein the text comprises a plurality of sentences; determining each sentence in the piece of written text; identifying, within each determined sentence, one or more words precision term from the database of precision terms; outputting data indicative of precision term use in the text and the precision characteristics of the writer.

In another aspect the invention consists in a system configured to determine one or more fluency characteristics of a writer from a piece of written text and output feedback to improve one or more of the writer fluency characteristics, the system comprising: a storage component configured to store processor executable instructions; and a processor configured to: receive the piece of written text with a computer, wherein the text comprises a plurality of sentences; determine each sentence in the piece of written text; match each determined sentence with a sentence type from a list of predetermined sentence types to thereby determine the sentence types within the text; aggregate a data set based according to determined sentence types; determine a measure of the writer's fluency characteristics based on the aggregated data; identify, within each determined sentence, one or more words precision term from the database of precision terms; then outputting feedback based on the determined measure of the writer's fluency characteristics and the precision characteristics of the writer.

In another aspect the invention consists in a method of determining one or more characteristics of a writer from a piece of written text and outputting feedback to improve one or more of the characteristics, the method comprising the first steps of determining writer fluency characteristics of: receiving the piece of written text with a computer, wherein the text comprises a plurality of sentences; determining each sentence in the piece of written text; matching each determined sentence with a sentence type from a list of predetermined sentence types to thereby determine the sentence types within the text; aggregating a data set based according to determined sentence types; determining a measure of the writer's fluency characteristics based on the aggregated data; and identifying, within each determined sentence, one or more words precision term from the database of precision terms; then outputting feedback based on the determined measure of the writer's fluency characteristics and the precision characteristics of the writer.

The following embodiments may relate to any of the above aspects. Other aspects of the invention may become apparent from the following description which is given by way of example only and with reference to the accompanying drawings.

As used in this specification, the term "and/or" means "and" or "or", or both.

As used herein, "computer-readable medium" excludes any transitory signals but includes any non-transitory data storage circuitry, e.g., buffers, cache, and queues, within transceivers of transitory signals.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which:

FIG. 11 indicates sentence type symbol date.

FIG. 12 shows a third exemplary sentence type pattern.

DETAILED DESCRIPTION

Figure 1:
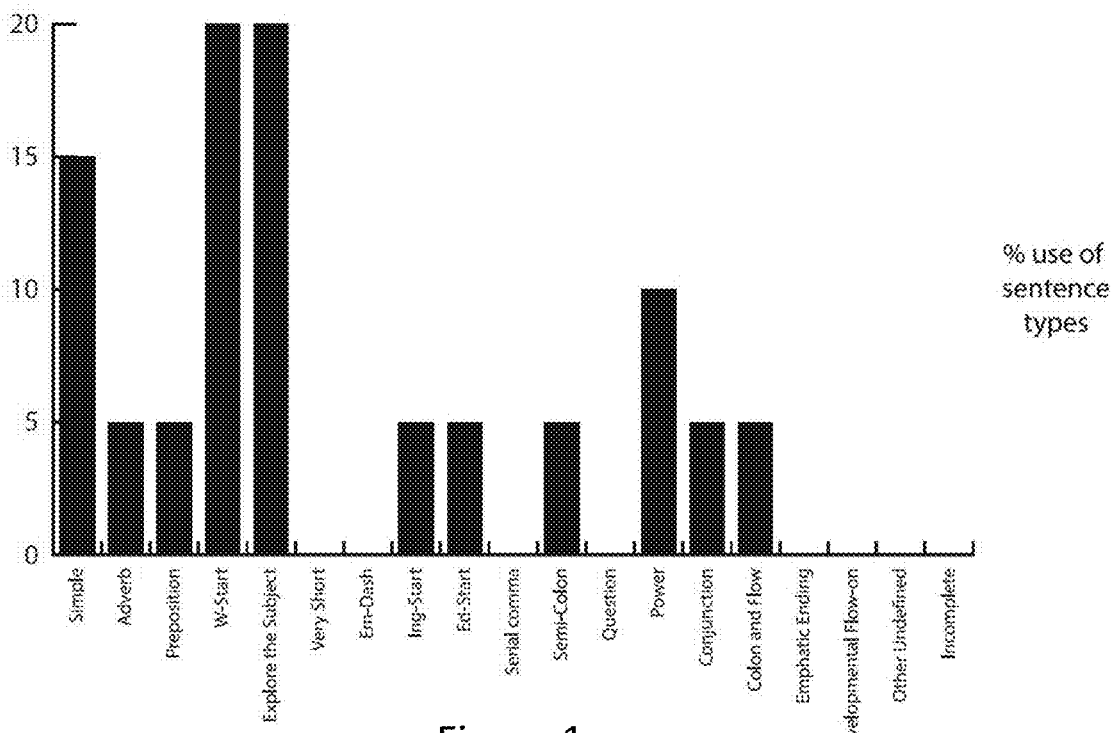
FIG. 1 shows a fluency chart of a well-known Pulitzer Prize-winning author produced in accordance with one embodiment.

For simplicity and illustrative purposes, the principles of the invention are described by referring mainly to an embodiment thereof. In the following description, numerous specific details are set forth in order to provide a thorough understanding of the invention. It will be apparent however, to one of ordinary skill in the art, that the invention may be practiced without limitation to these specific details. In other instances, well known methods and structures have not been described in detail so as not to unnecessarily obscure the invention.

Reference to the term fluency as used herein refers to a writer's command over a set of nineteen particular sentence types defined elsewhere within this specification. Command refers to the range of sentence types being used by the writer, the pattern of those sentence types and other factors. Some sentence types are known to those skilled in the art, some are newly defined.

The variety of different sentence types employed by a writer is analogous to the vocal range of a musician, or the shot capacity of a ball player—where the range of sentence types and how those sentence types are used by a writer employs reveals their 'range' as a writer and their style. Analysing the fluency of a piece of writing reveals the level of sophistication of writer: their ability to communicate in a rounded and meaningful manner. Some embodiments of the invention therefore relate to analysing the fluency of the writer, and determination of an output the writer may use to either generally improve their writing fluency, and/or change the style of their writing to the style used by, for example, a famous writer.

Sentence types play an important role in writing in both the creation of analytical writing and the development of a writer's unique voice. The presence or absence of different sentence types, and the pattern and frequency, is indicative of factors including how competent, fluent, articulate, and analytical a writer is. For example, overuse, or underuse of particular sentence types typically demonstrates limited expression capacity of the writer. Similarly, a lack of sophisticated sentence types also demonstrates limited expression capacity of the writer.

The sentence types used by a writer are also able to be analysed to better understand the skills and weaknesses of the writer. In particular, the presence or absence of different sentence types is indicative of how competent, fluent, articulate, and analytical a writer is. Using sentence types as the basis of fluency analysis enables deductions including the analytical skills of the writer, educational gaps in the writer's development, the writing patterns between boys and girls, and the writing patterns in large cohorts of writers, such as a group of students of a class.

Some embodiments of the invention relate to methods which include detection and analysis of writer fluency, then, providing feedback to the writer on how their fluency can be improved. Some embodiments are operable to profile aspects of a skill set of a writer and to provide feedback to that writer on how they may improve their skill set. In some cases, a writer can be guided toward writing in a particular style, such as that of a well-known author.

Such embodiments are provided by a system configured to implement a process where the sentence types are discovered from a piece of writing and a measure of one or more fluency characteristics of the writer are determined. Feedback is able to be provided to the writer based on the one or more determined fluency characteristics, thereby providing guidance toward improvements in analytical writing skills and/or changes to the author's unique style and sophistication.

The writing under analysis may be in the form of any new or pre-existing text based work. In some varied embodiments, there is a system and methods configured to provide the writer (or an educator responsible for the writer) with passive feedback such as suggestions or active feedback such as automated changes to the writing.

In some embodiments, some processes are undertaken by an on-line system configured to provide a writing environment and the tools available for writing. For example, the writing environment may be a text field area of a workstation display dedicated to word processing. That is, configured to allow text entry and adjustment by a user of a computing device. Entries into the word processing environment are evaluated locally or at a remote location automatically or when directed by an operator. The entire text or a portion of the text can be selected for evaluation and feedback. Feedback can be an inquiry, a suggestion or an instruction. One or more types of feedback are output that the writer may utilise to improve their written ability, and in particular, their expressive written ability.

The mode and type of feedback will depend on the proficiency level, demographics, and educational goals of the writer. The writer proficiency level may therefore be entered into the system before feedback takes place. The proficiency level may reflect a "grade" of writing ability, such as the age of a student or other measure of expected writing competency. However, the proficiency of the writer may be derived automatically from indicative characteristics. For example, by determination of one or more of aspects such as incomplete sentences, vocabulary range, grammar and/or spelling errors. The feedback may be prioritised to areas indicative of the most improvement to be made.

In some embodiments, a system is configured to implement the method. For example, the system is configured to receive a written piece for analysis from a writer, the system may then process the writing and store a record of characteristics in a database available recall by subsequent method processing steps, to the writer and an educator. The system has the capability of selective writing assessment and feedback both as to a portion of a written piece selected by the writer and as to the mode in which the feedback portion of the system operates. In one mode, the written piece is evaluated in real time, as the writing is typed. In another mode, the writing is evaluated when a request for analysis is made. The mode may be selected, for example, by selecting a virtual button on an application interface.

In some embodiments, the system is configured to monitor development of the writer based on historical data of previously analysed writing pieces. For example, determinations of various writer abilities based on sentence type analysis are stored and recalled for later use.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Figure 5:
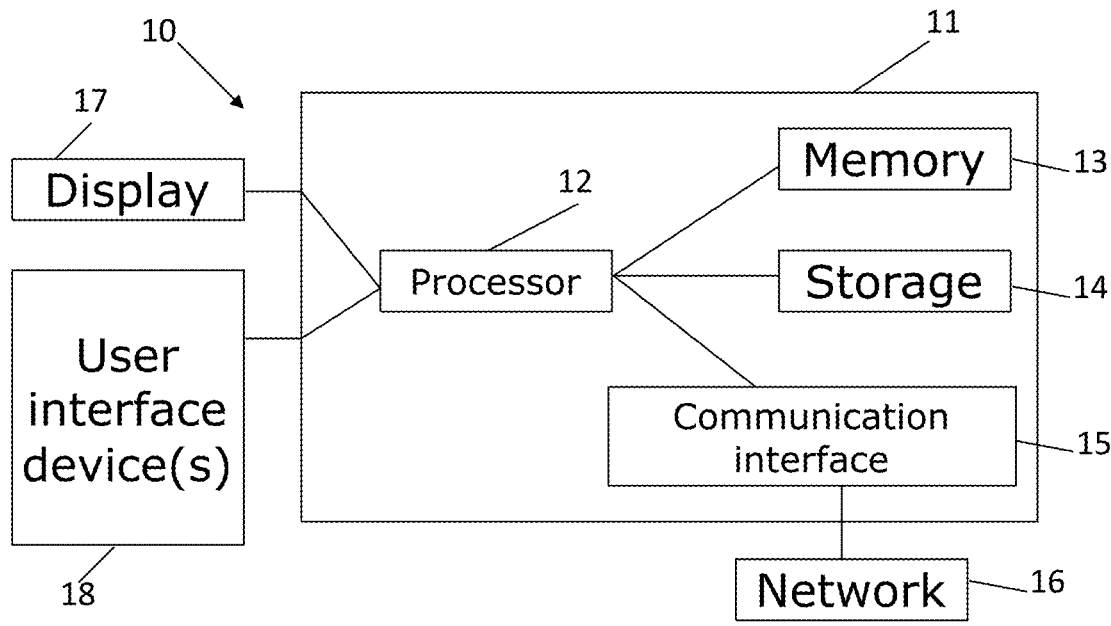
FIG. 5 is a block diagram of an exemplary system suitable for implementing one or more embodiments of the present disclosure.

FIG. 5 is a block diagram of an exemplary system 10 suitable for implementing one or more embodiments of the present disclosure. The system 10 may be implemented on one or more computing device 11 operable by a user or standalone. The computing device 11 includes a processor 12 connected by a data bus network to other components such as memory 13, a storage unit 14, a communication interface 15, a display 17 and one or more user interface devices 18 such as a mouse and keyboard.

The user input devices 18 include allow a user to input an action to the computer 11, such as selecting keys from a keyboard, selecting one or more buttons or links. The signals from the user input devices 18 are sent to the processor 12. Optionally, audio input/output components are included to allow, for example, voice commands and dictatorial input. In such circumstances, the computer 11 may include software for voice recognition and processing.

The processor 12 could be a microcontroller, digital signal processor (DSP), programmable logic controller (PLC), application specific integrated circuits or other processing component. The processor 12 is configured to processes various signals, such as signals from the user interface device(s) 18. The processor may be configured to display information on the display 17. The processor 12 is configured to execute computer-readable program instructions that are stored in data storage and are executable to provide desired processing functionality.

The system 10 performs specific operations by processor 12 and other components by executing one or more sequences of instructions to perform a function. In another example, the processor may be configured to interface with the communication interface 15, which in turn is capable of sending and receiving instructions via a network such as the internet. The desired functions of the processor may be contained as computer-readable instructions such as code. The code may be stored locally on a computer readable medium such as the storage device 14 or sourced from a location external to the computer. A computer readable medium may refer to any medium that participates in providing instructions to processor 12 for execution. Such a medium may take many forms, including but not limited to, non-volatile media, volatile media, and transmission media. In various implementations, non-volatile media includes optical or magnetic disks, volatile media includes dynamic memory, such as system memory component 13, and transmission media includes coaxial cables, copper wire, and fibre optics. In one embodiment, the logic is encoded in non-transitory computer readable medium. In one example, transmission media may take the form of acoustic or light waves, such as those generated during radio wave, optical, and infrared data communications. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

The processor 12 is ideally configured to control the transmission of information with other devices. Other devices may include, for example, other computers, servers or networks. The network 16 may be wired, wireless, or a combination of both.

In various embodiments of the present disclosure, execution of instruction sequences to practice the present disclosure may be performed by computer system 10. In various other embodiments of the present disclosure, a plurality of computer systems 10 coupled by communication link 15 to the network 16 (e.g., such as a LAN, WLAN, PTSN, and/or various other wired or wireless networks, including telecommunications, mobile, and cellular phone networks) may perform instruction sequences in coordination with one another.

Software for implementing one or more embodiments in accordance with the present disclosure, such as program code and/or data, may be stored on one or more computer readable mediums. It is also contemplated that software may be implemented using one or more general purpose or specific purpose computers and/or computer systems, networked and/or otherwise.

The software may be controlled by any one or more of the following aspects: a Graphical User Interface (GUI) application in a client device that can translate GUI commands into text-based commands; a standalone application in a client device; a gadget on a computer desktop or in a web site; a web site; a Wireless Access Point (WAP) interface; an e-mail interface; and/or a Really Simple Syndication (RSS) interface.

In the following description various embodiments of a writing evaluation system, along with methods of construction and use are provided. The examples provided refer to the evaluation of a piece of writing utilising the above described analysis based on determined sentence types. Where applicable, the ordering of various steps described herein may be changed, combined into composite steps, and/or separated into sub-steps to provide features described herein.

In some implementations, a computer system is configured to receive the writing directly from a user who is typing directly into the user interface device 18, or dictating, or a document is to be received electronically. However, it should be understood that while many processes herein are discussed as being implemented by a computer system, many of those processes may equally implemented in person. The computer system includes program readable instructions that are configured to execute the writing analysis steps according to one or more of the various analysis processes outlined in detail below. In some cases, a handwritten document may be scanned using optical character recognition technology and provided to the computer system. The writing is preferably stored in memory 13 for retrieval and analysis.

Aspects of the present invention are described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams described herein and in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Sentence Types

Referred to herein are "sentence types". There are nineteen different sentence types recognisable by one or more characteristics. These characteristics can be characterised by a selection of logic conditions. In some embodiments, these logic conditions are implemented by a processor, where the processor is configured to identify each sentence type in a piece of written text by application of a selection of logic conditions. While a skilled human operator may be the most adept at identifying a sentence as one of the particular sentence types, it is envisaged that a machine learning process is the most practical and efficient way of determining logic conditions.

In the ensuing list, some sentence types are known to the prior art and some are not. Those skilled in the art will also appreciate that there are other known sentence types. However, this finite list of sentence types has been selected as the particular sentence types that enable the advantages of the invention to be realised.

The list of predetermined sentence types consists of:
Simple Sentence;
Adverb Sentence;
Preposition Sentence;
W-Start Sentence;
Explore the Subject Sentence;
Very Short Sentence;
Em-Dash Sentence;
Ing-Start Sentence;
Ed-Start Sentence;
Serial comma sentence;
The Semi-Colon Sentence;
Question Sentence;
Power Sentence;
Conjunction Sentence;
Colon and Flow Sentence;
Emphatic Ending Sentence;
Developmental flow-on sentence;
Undefined Sentence; and
Incomplete Sentences.

An explanation of these sentence types is as follows.

1. Simple Sentence

A simple sentence is constructed in the order of a subject then a predicate.

For example:

"Henry (subject) was walking across the road (predicate)."

"I looked for John and Mary at the train station."

For the purposes of this typology, the compound sentence where a conjunction joins two independent clauses, is also included under simple sentences. This is because functionally and stylistically the compound sentence behaves the same way as a simple sentence in writing. For example "He ran to the house, and he opened the front door."

2. Adverb Sentence

An adverb sentence commences with an adverbial start. It may be a single adverb or an adverbial phrase.

The system 10 is configured to store, in a database, forms of adjectives including words with "-ly", such as cautiously, gently, thoughtfully, as well as common and uncommon adverbs, such as: Just, Today, So, Now, Then, More, Also, Here, Well, Even, Yet, Often, Later, Once, Together, However, Still, Again, Right, Already, Maybe, Perhaps, Sometimes, Soon, Thus, Indeed, Rather, Instead.

The system is configured to detect an "Adverb Sentence" type by the following process:

1) Match sentences that commence with adverb from database;
2) Exclude sentences that are five words or less in length (this is determined as the later described "Very Short" Sentence type).
3) Exclude sentences that conclude with a question mark.
4) Check for comma following the initial adverb or adverbial phrase, and if no comma, record for grammatical improvement.

The following sentences are examples of those that fulfil the logic requirements as adverb sentences—note, the final sentence is still recorded in this typology as an Adverb Sentence type, despite the use of additional modifiers at the conclusion of the sentence.

For example "Rapidly, Henry walked across the street."

"Interestingly, red was John's favourite colour."

"Slowly through the bushes, Martha crawled to see the house."

"Just like everyone else, Suzie loved raspberries."

"Gently, Henry lowered his sack into the trench."

"However, the battle was not as easily won as the French first estimated, despite the presence of Polish reinforcements, which had arrived the night before."

3. Preposition Sentence

A preposition sentence commences with a prepositional phrase.

The system is configured to store, in a database, prepositions including: along, amid, among, around, as, at, before, behind, below, beneath, beside, besides, between, beyond, but, by, despite, down, during, except, for, from, following, in, inside, into, minus, near, off, on, opposite, outside, round, since, through, to; toward, towards, under, underneath, unlike, until, up, upon.

The system is configured to detect a "preposition sentence" type by the following exemplary process:

1) Match sentences that commence with preposition from database
2) Exclude sentences that are five words or less in length (this is determined as the Very Short Sentence type).
3) Exclude question sentences [concluding with a question mark].
4) Exclude prepositions such as within, without, with—these determine the sentence as a W-Start sentence type.
5) Exclude prepositions that at the start of a sentence act as adverbs or conjunctions. Match to pre-determined list that includes prepositions such as: like.
6) Include sentences that commence with -ing forms, such as following, during. Though appear to qualify as -ing type sentences, these are more firmly acting as preposition sentences as they are adding a positional element to the sentence.
7) Check for comma following prepositional phrase. If no comma, record for suggested grammatical improvement.

The following sentence examples fulfil the logic requirements of a preposition sentence type—note, the final sentence is still recorded in this typology as a Preposition Sentence type, despite the use of additional modifiers at the conclusion of the sentence which make it longer and more complex—but still counted here as preposition type.

"Amid the confusion, the fire fighters lost their equipment."

"During the 1990s, the stock market generally performed well in most Western economies."

"Under the bridge, Henry sat down to eat his lunch."

"During the 1990s, trade in Europe came to a standstill."

"As a child, Henry had often been ill, especially in the winter months when his family left Paris and headed north."

4. W-Start Sentence

A W-Start sentence commences with w-words used in the form of interrogative adverbs, or conjunctions, typically structured as dependent clauses.

The system is configured to store, in a database, prepositions including w-words such as: where, when, while, with, who, what, whereas, why, whether, within, without.

The system is configured to detect a "W-start" sentence type by the following exemplary process:
1) Match sentences that commence with W-words from database
2) Exclude sentences that are five words or less in length (this is determined as the Very Short Sentence type).
3) Exclude question sentences [concluding with a question mark] and using the interrogative adverb in the manner of a question, such as: Why did the Allies invade France?
4) Check for comma following W-start phrase. If no comma, record for grammatical improvement. If a comma is present, it will normally occur within the first ten words of the sentence commencing. Such as: When the Allies landed at Omaha Beach, the Germans were already waiting.

The following sentence examples fulfil the logic requirements as W-start type sentences—note, the final sentence is still recorded in this typology as a W-start Sentence type, despite the use of additional modifiers at the conclusion of the sentence which make it longer and more complex—but still counted here as W-start type.

"Without a compass to rely on, the tramping party got quickly lost in the vast valleys of the Grand Canyon."

"When you burn fossil fuels, carbon and oxygen get released into the atmosphere and are blown around by the winds."

"While many believed the Chinese economy was invincible, 2017 proved otherwise as the industrial slow down eventually caught up with textile manufacturers in the South, especially those around Beijing."

"When we were at the beach, Mary saw her first sunset."

"While he was sleeping, John had a terrible nightmare."

"Who had taken the wallet was not the most important question to be answered."

5. Explore the Subject Sentence

Explore the Subject Sentences have a structure composed of a noun or noun phrase followed by a non-defining relative clause or apposition, concluding with the remainder of the sentence.

For example:

"Fred, who worked in New York as a car salesman, was educated in Boston."

"The first moon landing, which occurred in 1969, was broadcast all over the world."

6. Very Short Sentence

A Very Short Sentence is five words or less and often used by a writer for impact. A Very Short Sentence is often constructed in the form of a simple sentence.

For example:

"The economy collapsed."

"Japan in 1987 was shaking."

"Austen was a hack."

7. Em-Dash Sentence

An Em-dash sentence is constructed with the use of an oblique phrase separated from the sentence by one or more long dashes (technical term em-dash). An Em-dash sentence is used to present an oblique phrase such as a change in voice, narrator, or direction of the sentence. An Em-dash sentence may occur at any point in the sentence, that is: to commence, separate, or conclude the sentence.

For example:

"The Ferrari-fast, luxurious, sleek-stalled at the lights."

"Sleek, fast, luxurious—the Ferrari stalled at the lights."

"Everyone in Italy wanted to own a Ferrari—you can hardly believe it."

8. Ing-Start Sentence

An Ing-Start Sentence commences with the "-ing" form of a verb. The verb is often in the form of a present participle, or may be in the form of a gerund.

For example:

"Walking to the bus station, we saw Mary leave her house."

"Talking to Henry was an absolute riot."

9. Ed-Start Sentence

An Ed-Start Sentence is where a sentence commences with the "-ed" form of the verb.

For example:

"Committed to saving nature, Greenpeace attracts many followers.".

"Determined to succeed, John ran faster than he had ever done before in his life."

10. Serial Comma (Red, White, and Blue)

A serial comma sentence is constructed using the serial comma (also called the Oxford comma and the Harvard comma). The body of the sentence may be various: complex or simple or commence with alternative verb forms. However, what is significant is that the sentence is constructed around delivering information in the form of the serial comma. The comma is placed prior to the conjunction in a series of three or more terms.

For example:

"She was an outstanding girl who was strong, loyal, and courageous."

"The jet was sleek, well-engineered, and inexpensive to operate."

11. The Semi-Colon Sentence

A Semi-Colon Sentence includes two independent clauses where the writer has separated the clauses with a semi-colon replacing what would have been a conjunction.

For example:

"He was a remarkable general; he was a friend of all."

(Instead of: "He was a remarkable general and he was a friend of all").

12. Question Sentence

A Question Sentence is where the writer has posited a question in the text.

For example:

"Do teachers really make a difference in the lives of students? What if students were allowed to decide their own education, wouldn't they excel even further?"

13. Power Sentence

A Power Sentence is a sentence delivered in 12 words or less, and not a short sentence (i.e. five words or less). A power sentence is not a question, rather typically a sentence commencing with a mass noun and the brevity of the sentence adds to its impact.

For example:

"Courage is not something we seen everywhere in life."

"Inspiration doesn't come from sitting around all day under trees daydreaming."

14. Conjunction Sentence

A Conjunction sentence commences with a conjunction.

For example:

"And as much as you would like to think that painting like that was easy, it was not."

"But by the middle of the year, the students were getting quite worn out."

15. Colon and Flow Sentence

A Colon and Flow Sentence is constructed with the use of a colon introducing an appositive or a list of items.

For example:

"It was a marvellous musical: brilliant and engaging."

"He launched out in business after reading a remarkable biography: The Never-ending Journey."

16. Emphatic Ending Sentence

An Emphatic Ending Sentence is constructed using typically a past or present tense verb as the final word in the sentence for emphatic reasons. Often the start of the sentence has one or more dependent clauses. These clauses have the effect of holding a reader's attention to the conclusion of the sentence where the meaning is provided.

For example:

"Having a plan that made sense and one that his voters supported was an idea the Governor had unfortunately dismissed."

"The rising tide of racial injustice, the growing discontent among ordinary people—these are things are things our society can no longer tolerate."

"In the middle of a thronging crowd she raised her hand silently and with a dismissive flick of her wrist the taxi driver was immediately banished."

17. Developmental Flow-on Sentence

A Developmental flow-on sentence is constructed as a simple sentence with a dependent clause tailing the sentence, typically in the form of a "-ing" verb heading the clause.

For example:

"The house was suddenly bathed in light from a source in the centre of the dining area, leaving the corners of the room etched in suspicious darkness."

18. Undefined Sentence

An Undefined Sentence is classified as any sentence that is not covered any of the other typologies. An undefined sentence may include, for example, original combinations of dependent or independent clauses.

19. Incomplete Sentences

An Incomplete sentence has a variety of forms. For example, gross grammatical errors and syntactical errors making the meaning of the sentence void. Equally, fragments or dependent clauses represented as sentences. In each of the below examples, meaning is absent. They are not sentences.

For example:

"While we waited."

"Although it was difficult."

"But never mind, and the plane was moving quickly round right okay."

Sentence Type Determination

To determine a sentence type, sentences must first be identified within a passage of writing. A parsing process is used to detect one or more sentences in the passage of writing. That is, the writing is analysed to detect strings of characters that conform to the rules of grammar. In some embodiments, the system is further configured to detect paragraphs. Each sentence that is identified is processed to determine which particular sentence type it best conforms to.

The system 10 is configured to detect and aggregate sentences types with respect to the text being analysed. The term aggregate as used in this specification refers to the treatment of the sentences identified within a piece of writing. Treatment includes summing sentences of a particular type; comparing the quantity and/or frequency and/or rate of particular sentence types to other particular sentence types; comparing the quantity and/or frequency and/or rate and/or order of particular sentence types to one or more thresholds; and/or applying logic conditions to any one or more treatment.

For example, the system can be configured to store one or more of a list of detected sentence types, the number of times the sentence type has been detected, and data linking the detected sentence type to the sentence in the text where it was detected. Each stored sentence type maybe a database of particular words or characters that are used to determine a sentence type. For example, some sentence types begin with a particular word such as an adverb. For example, the system is configured to store a list of adverbs and attempt to match those adverbs stored in the list to words used in the text submitted by a writer. In this example, where the adverb is matched, a particular sentence type is detected.

The particular aggregation treatment may be based on the writer's prior results, and then depending on their age, ability, and results. In some embodiments, a decision tree is applied to determine the best benefit to output to the writer from a writer improvement and an educational perspective. That is, the best order to give writing improvement suggestions is dependent on the level of a writer. The level of the writer is able to be determined from aggregation of sentence type data identified in a new piece of written work, and is also able to be determined based on historic work. In this way, the system is configured to store data identifying historic use of sentence type data for later recall.

Particular sentence types identified by the parsing process types are determined by application of a set of logic rules to the identified sentences. These logic rules may be stored in a database in memory 13 and retrieved by the processor 12 for application to a sentence that has been successfully parsed from a group of text. In the text, parts of speech can be matched from databases holding common examples and the application of logic rules.

In other embodiments, particular sentence types are identified by an artificial intelligence, machine learning based algorithm. That is, sentence types are determined based on predictions made after training a prediction algorithm. The algorithm may be based on historical data accumulated from analysis of a variety sources of sample writing and/or trained by exposure to a selection of particular sentence types. Determinations may be ultimately decided, for example, by computing the probability of a sentence confirming to one sentence type over one or more others.

Machine learning algorithms may be trained by exposure to sample writing which was also subject to analysis by a skilled person. Alternatively, a skilled person with applicable sentence type identification skills may be tasked with identifying sentence types based on identified sentences in a piece of writing. Alternatively, the skilled person is used to train the machine learning process.

The data set from which the learning algorithm is trained may also be formed from passages of writing from a writer under analysis. That is, trained to a particular writer or writing style. A learning algorithm applied to a variety of writers with a variety of writing styles is best trained by exposure to a variety of writers and writing styles. Any combination of machine learning and logic criteria may also be utilised to make a sentence type determination.

Writer Fluency

The presence or absence of different sentence types is indicative of how competent, fluent, articulate, and analytical a writer is. For example, an overuse of the "serial comma" sentence is indicative of a writer who is merely passing on information and not analysing that material. Absence of more sophisticated sentence types, such as an "Explore the Subject" sentence, is indicative of limited expression capacity of the writer. Similarly, repetition of more simplistic sentence types, such as "prepositional starts" and "simple sentences" is indicative of limited expression capacity of the writer. Some embodiments of the invention discussed herein therefore relate to determination of absent, underused or overused sentence types, and the provision of feedback that may include a directive to make better use of those sentence types. Better use may be, for example: changing an existing sentence type to an unused sentence type; adding a new sentence of a particular unused sentence type, changing and relatively overused sentence type to another sentence type and so on.

For example, a Grade 12 student who is showing fluency and sound academic ability will employ six to eight different sentence types in a piece of writing that is 300 words or longer. In another example, a Grade 12 student who displays only three sentence types in a 300 word piece will be displaying limited fluency and limited capacity to express themselves. If the same writer was to pen a longer piece, say of 900 words, and only display three sentence types throughout this piece, then the piece would appear dull, repetitive in nature, and predictable. That writer could be said to have poor command of writer fluency. Such a writer may then be directed to improve by being directed to use of a wider range of sentence types.

A writer who may benefit from improved fluency through an increased deployment of sentence types often exhibits one or more of:
 a low understanding of writing at a medium of expression;
 little command over their own written expressive capacity;
 thoughts underdeveloped or appearing stilted;
 no clear voice in their writing, instead predictable and mundane;
 lack of clarity in expression;
 tendency to overwrite;
 little depth of expression;
 the sentence length in the piece is all of similar length resulting in a dull and repetitive feel;
 thoughts are conveyed repetitively; and
 a limited sophistication.

From a developmental perspective, the analysis of writer fluency as indicated by determining their use sentence types is useful for the educator as it reveals the capacity for student literacy development.

Some of the sentence types are indicative of more advanced writing skill, so, an educator would expect to see these in students of older age ranges, such as the "Em-dash" or "semi-colon" sentence types. Equally, some sentence types are essential for competent analytical writing, such as the W-start sentence.

Once the student has reached college age, the presence and use of the "Adverb start" sentence or the "Explore the Subject" sentence or the "Developmental flow-on sentence" or the "Em-Dash sentence" are essential for a strong exhibition of writing fluency. Students who lack these sentence types in their writing can be identified and assisted with their development.

According to some examples, an improved sentence is objectively one in which:
 the writer's technical errors (such as errors of capitalisation, punctuation, spelling) have been reduced;
 the writer has been directed to alter the position or sequencing or amount or type of words within the sentence to better match a particular sentence type;
 the writer has been directed to alter the sentence to one of a different type to thereby produce a stronger pattern in respective of the sentence types positioned around their sentence; and/or
 the writer has been directed to alter the precise elements in the sentence to improve the accuracy and strength of the sentence, or any combination of the above.

Figure 6:
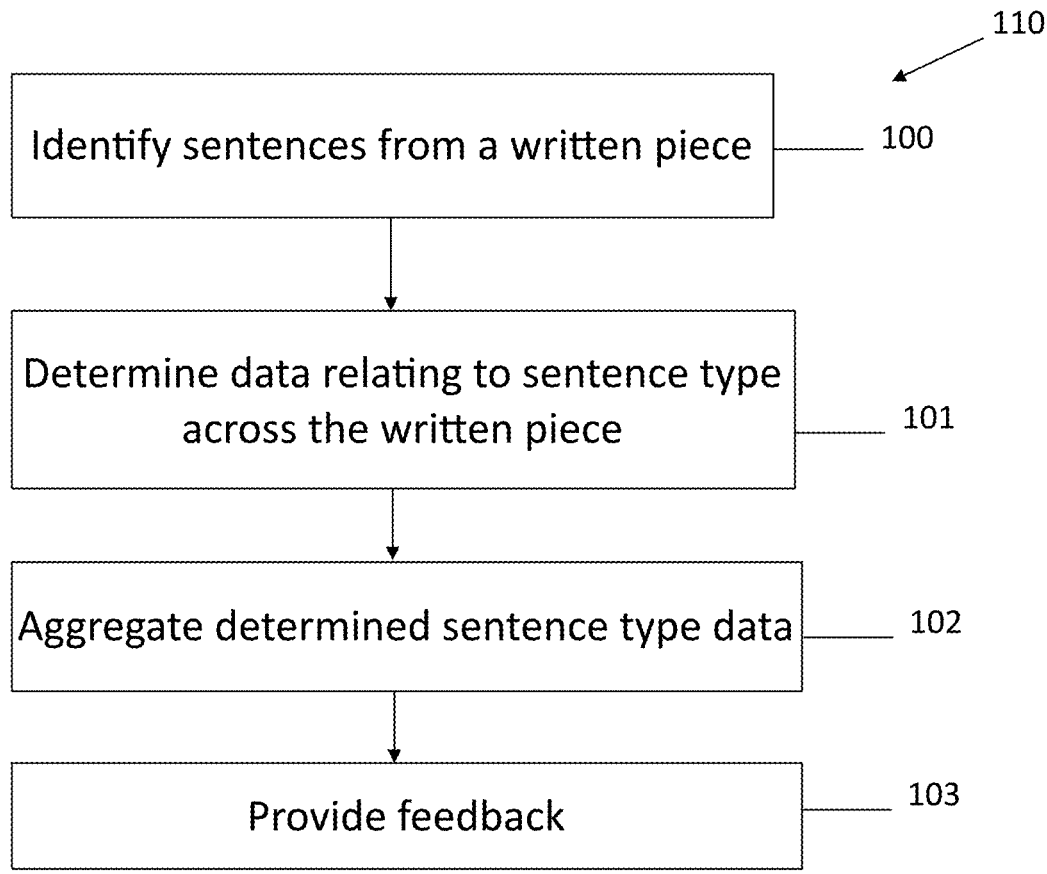
FIG. 6 is a flow diagram of a method for analysing a piece of writing based on sentence type analysis.

FIG. 6 is a flow diagram of a method 110 for analysing a piece of writing according to one preferred embodiment of the invention. The method may be implemented in person or by any suitable computer implemented system such as the system 10 and/or facilitated via any suitable computer network such as the network 16 shown in FIG. 5.

The method 110 is preferably initiated in response to receiving a written piece in any form readable by the system 10, or receiving some initiation prompt. In the following description of steps 100-103, a method of analysing and generating a form of feedback suitable for improving the writer of a piece of writing based on sentence type data is described.

At the first step 100: The method comprises identifying sentences from a written piece. The sentences are identified by a text parsing process that those skilled in the art will be familiar with. The parsed text is analysed to identify individual sentences (and paragraphs if desired).

Each identified sentence may be recorded in a file on any available storage media and/or tagged with a unique identifier such as an identification code or provided a unique place in a list. For example, each identified sentence may be stored in an array in the order they appear in the piece of writing.

At the second step 101: The method comprises analysing each identified sentence to determine data according to sentence type it conforms to from the set of nineteen particular sentence types in the above described list. To perform this step, each of the identified sentences are analysed to determine the particular words and characters used. Each sentence type is characterised by the presence or absence of particular words and/or characters, and the position of those words and/or characters. Any number of conditional statements may be applied to each identified sentence in order to determine the sentence type that best fits with each identified sentence.

At the third step 102: The method comprises aggregation of the data according to sentence type each sentence best conforms to.

At the fourth step 103: The method comprises providing feedback to the writer, the feedback based on the aggregated sentence type data.

Aggregation includes summing the sentence types in use and gathering other forms of statistical data useful as a basis from which to provide feedback for the writer, and the particular form of aggregation and form of feedback are often linked.

The term feedback used within this specification means to generate and provide information to the writer based on the step of aggregation of the data, and is indicative of on one or more areas of their writing that could be improved, based on evaluation of their writing and a determination of one or more likely areas the writing could be improved. The evaluations made are based on the sentence type analysis in use, and/or the use of precision terms.

Feedback is for use by the writer to facilitate improvement of their fluency and the type and form of the feedback generated is ideally based on the result from the aggregation of data. The aggregated data should therefore be one which is most applicable to the form of feedback. Further, feedback may comprise more than one type.

In an example, feedback is an indication of the sentence types used and not being used by the writer in the analysed written piece. Based on this feedback, the writer is are enabled to identify strong and weak use of particular sentence types, and adapt their writing to incorporate unused or infrequently sentence types to enhance their writing ability. To support this exemplary form of feedback, the step of aggregation comprises summing the quantities of particular sentence types used; then providing the writer an indication of the quantities of each sentence type used and/or not used.

In some embodiments, as part of a feedback mechanism, one or more portions of the text may be tagged with a visual reference, such as an underscore, drawing attention to any particular sentence that requires attention. Furthermore, feedback may comprise the automatic generation of sentences of a particular sentence type, or at least the basic structure of a new sentence type, and at least an indication of the sentence that could replace or enhance one or more of those sentences already present, to thereby create an improved sentence.

There are potentially many ways the data can be aggregated at the third step, and a particular way may be selected based on the form of the feedback desired at the fourth step in order to produce an improved sentence. However, the form of feedback is dependent or ideally based on the result of the aggregated data.

In an example, feedback is provided by way of a fluency chart as described below with reference to FIGS. 1 to 4. The fluency chart provides quick visual identification of sentence types in use, those types used more or less than others, and those that are absent from the writing piece. For example, the processor may be instructed to generate graphics representing a fluency chart from the aggregated sentence type data and output those graphics to be shown on the display device of the computer system. This may be in the form of a chart, as depicted, or in some other graphical representation to exhibit the relative frequencies or pattern of sentences that the writer is using or has proficiency over or likes.

Fluency Charts: Capacity and Style

The fluency capacity of a writer is demonstrated by the deployment of the variety of sentence types. The fluency capacity and a representation of the style of a student can be revealed by a fluency chart which provides a visual representation of the characteristics of the writer. The fluency chart is a visual representation of the quantities of sentence types utilised in a piece of writing, or relative frequencies of sentence types utilised such as the percentage of sentence types used within a particular piece of writing. The fluency chart is indicative of both strengths and weaknesses of a writer by indicating unused and overused sentence types, among other aspects such as the relative or ratios of sentence types used. Production of two or more fluency charts spanning a period of time also reveals the development progress of a student. Accordingly, in some embodiments a fluency chart is feedback provided to the writer based on analysis of their written work which makes apparent absent, underused or overused sentence types. Implicitly, from the apparent content of the fluency chart, the writer is directed toward improvements to their writing simply by attempting to change the form displayed by the fluency chart.

The fluency chart may also be indicative of changes the writer may make to rectify illustrated indications. However, further indicative information is able to be derived from the data forming the basis of the fluency chart. This data includes features such as the ratio of some sentence types compared to others. As will be discussed, the ratio of various sentence types used is often indicative of particular writing styles. A writer desiring to write in a particular style may receive valuable and instructive feedback from an indication of the sentence type data determined by analysis of their written work.

FIG. 1 shows a fluency chart of a well-known Pulitzer Prize-winning author produced in accordance with one embodiment. Each graph in the chart is determined from analysing the writing of a passage. The types of sentences the writer uses are indicated along the X axis and the frequency of deployment (as a percentage of the piece analysed) is shown on the Y axis.

The chart of FIG. 1 is produced from analysis of the first twenty sentences of a novel published by the author. Across twenty sentences, the writer draws on eleven different sentence types. This author demonstrates a range of sentence types which communicate their ideas and optimise captivation of the reader. Deployment of this many sentence types in a relatively limited number of sentences demonstrates an in-depth knowledge of language and sentence construction techniques. Therefore, in some embodiments, a writer is provided feedback of their sentence types in use for a piece of writing, and further, their sentence types in use is compared to one or more other written works of a desired style. Provision of the sentence type data in use is instructive to the writer on how the desired writing style may be achieved.

Figure 2:
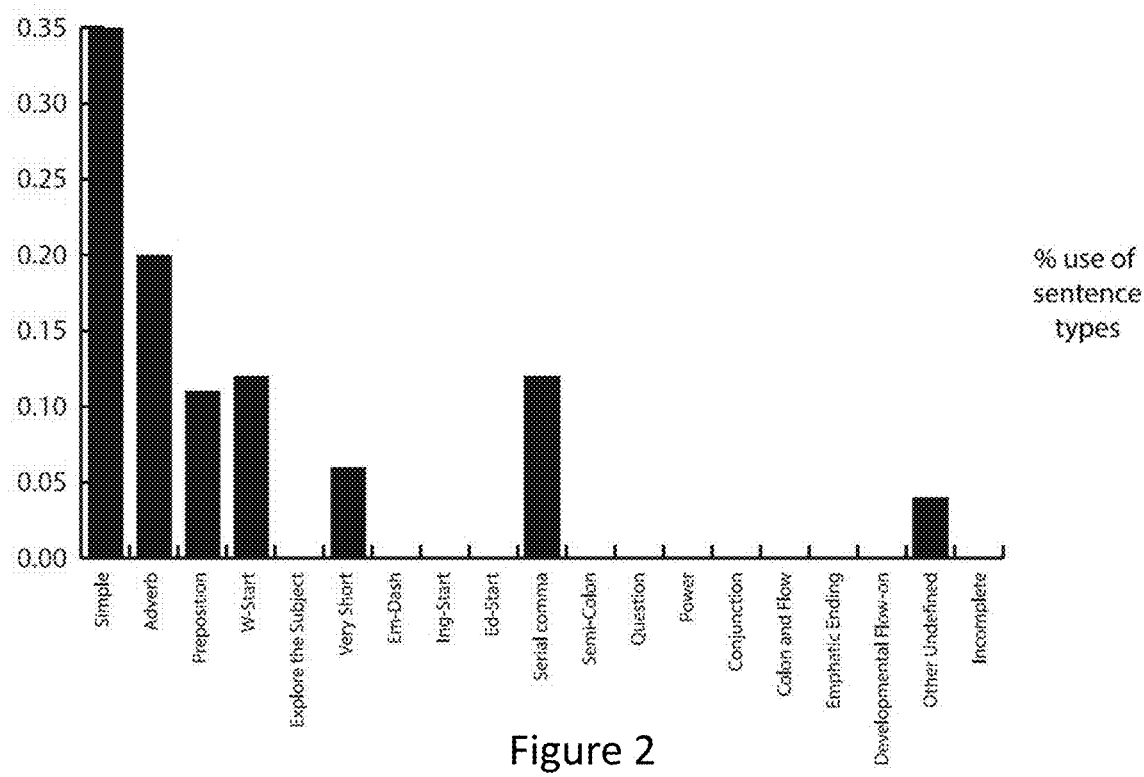
FIG. 2 shows another fluency chart produced from a piece authored by a high school student.

FIG. 2 shows another fluency chart produced from a piece authored by a high school student. This student is in their senior year at high school, and are hoping for a top grade.

Figure 3:
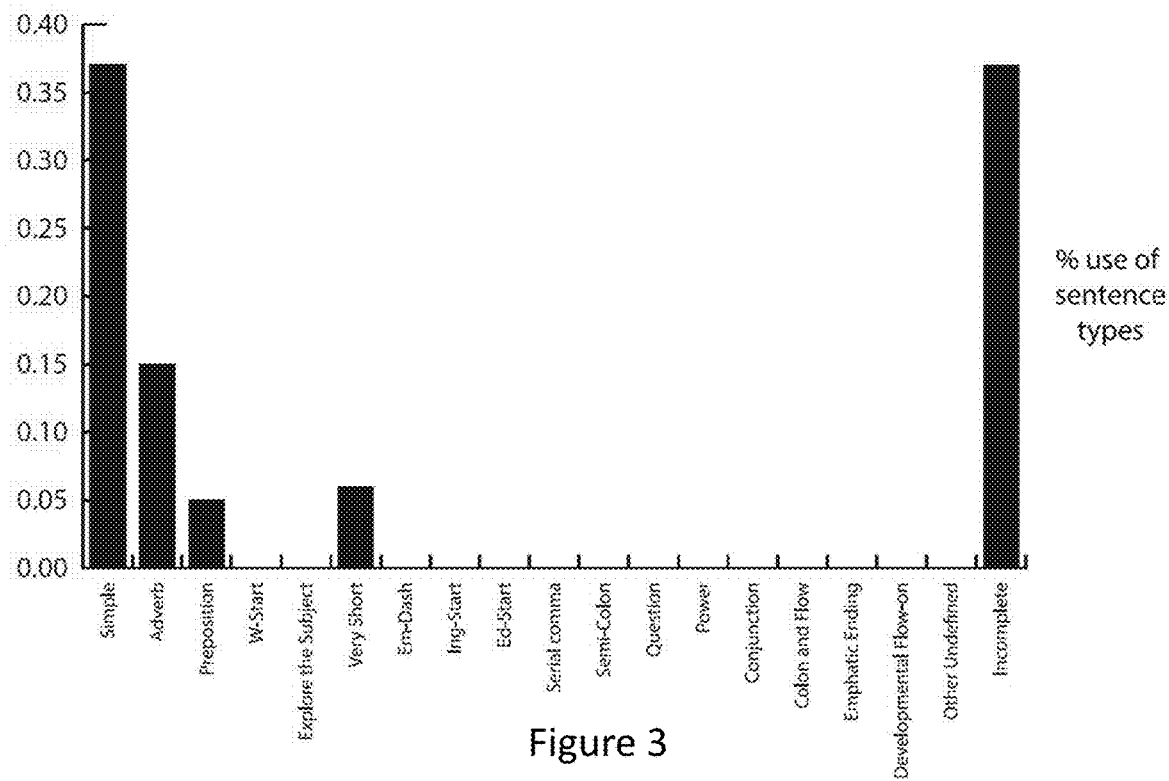
FIG. 3 shows a further example of a fluency chart produced from the writing of a second high school student.

The fluency chart of FIG. 3 demonstrates three important characteristics that can be leveraged to improve the writing ability of the student. Compared to the chart of FIG. 2, the range of sentence types deployed by the prize-winning author is almost twice that of the student. Second, the student is relying on mostly simplistic sentence styles, deploying none of the more sophisticated sentence types, such as the "semi-colon" or "Explore the Subject" sentence types (the use of the indefinite relative clause) to express their ideas. As a result, the writing of the student, while informative, will not display the same level of fluency nor flair as the published author.

The fluency chart also provides revealing analysis of sentence types not used by the student. The fluency capacity of the senior high school student reveals to an educator, tasked with developing the skills of the writer, the sentence styles the student could develop in order to improve their expressive capacity. Therefore, according to some embodiments, one form of feedback provided to, for example the writer or an educator responsible for the writer, are sentence types that are unused. Improvements to the writing ability of the writer is enabled by directive of an instruction to employ previously unused sentence types.

FIG. 3 shows a further example of a fluency chart produced from the writing of a second high school student (again Grade 12). This student was observed to have a sound knowledge of their subject content but is struggling in written work to pass examination tasks. Examining their fluency capacity reveals some key contributing reasons: the student's writing is largely divided between simple sentences and incomplete sentences (37% of both); no sentence types that display greater fluency are evident; no sentence types that display basic analytical skill (such as the W-start sentence type) are evident. Remedial work for an educator with this student can be directed by tuition of a wider range of sentence types, and which particular sentence types would be most usefully studied by the student.

Figure 4:
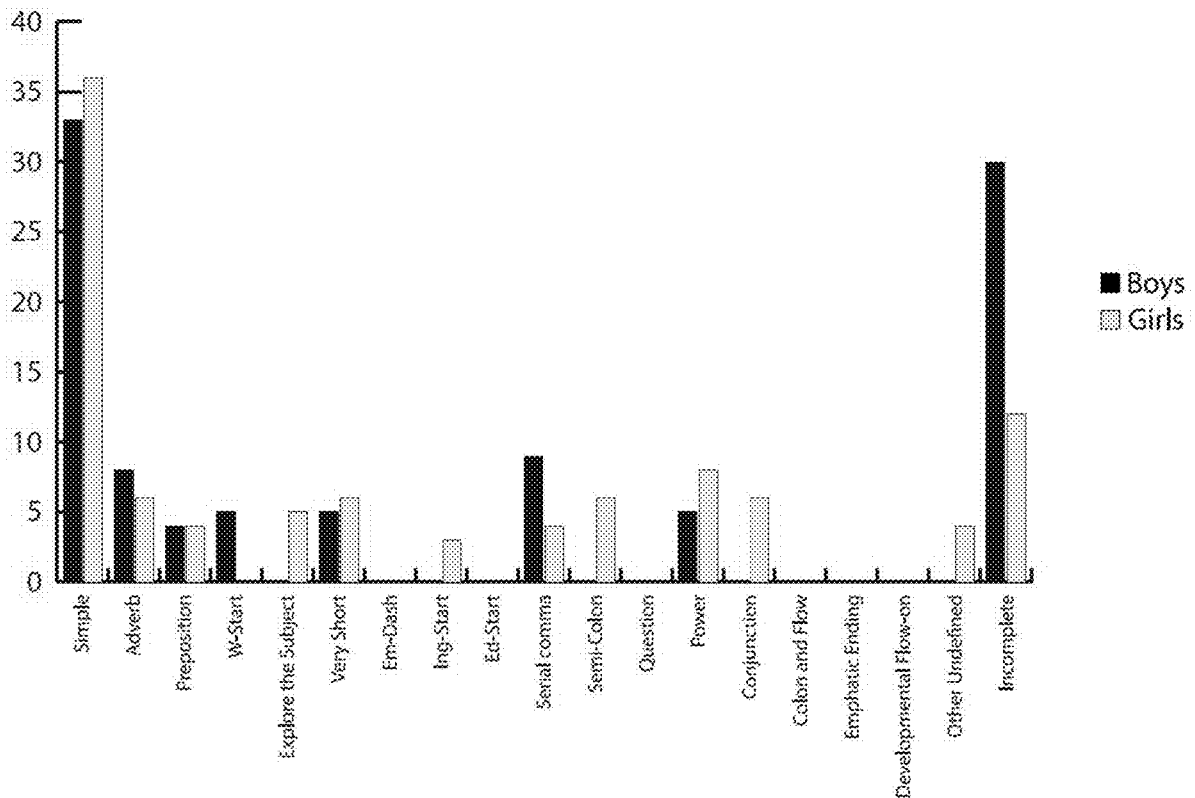
FIG. 4 shows a fluency chart constructed from writing pieces from students in a whole school.

Fluency charts can also be used to better understand the teaching impact with cohorts of students, even whole schools. FIG. 4 shows a fluency chart constructed from writing pieces from students in a whole school. Girls and boys are distinguished to better understand the relative strengths between the two. Immediately clear in the chart is the disproportionate number of incomplete sentences that boys are writing compared to girls.

Boy students in this school are indicating a fundamental lack of knowledge of sentence construction, which is an area for teacher intervention. Also displayed is the limited sentence writing capacity of the boys compared to the girls.

The girls display a fluency range of eleven sentence types (not including incomplete sentences). The boys of the same age displayed a range of only seven. The girls, almost twice as strong in their capacity for written expression using different sentence types.

Returning to FIG. 6, another form of feedback is providing a visual reference or tag to any particular sentences in the written piece that may benefit from change or redrafting.

In an example, a particular sentence for attention may be one where a particular sentence type has been used successively, such as three or more times. In some embodiments, the method comprises identifying successive use of a particular sentence type at least three times, then outputting feedback comprising at least one of: a visual identification of the repetition, and providing a selection of sentence types for substitution with at least one of the identified repeated sentence types. The writer is then enabled to improve their writing fluency by consideration of another sentence type from the selection that may invigorate their writing.

In another example, a sentence type which is almost correct in its deployment by the writer but requires amendment in order to complete its syntax strength, or improve its clarity of expression. In some embodiments, the method comprises identifying a syntax deficiency, and providing an indication of a syntax improvement.

Another form of feedback is directing the writer to prefer one sentence type over another due to their age or ability level in order to extend their capabilities. That is, is may be advantageous to the writer to begin to use a sentence type that they do not have in their range and see this sentence type identified for learning. In such embodiments, the method comprises identifying a selection of sentence types used by a writer, identifying the sentence types not used by the writer, determining a level of difficulty associated with the sentence types not used by the writer, and providing a list of sentence types not used by the writer. The writer is then enabled to improve their writing fluency by incremental use of more complex sentence types.

Another type of feedback is to direct the writer to alter the order of their sentence types so as to create more sophisticated writing. In such embodiments, the method comprises the steps of identifying a selection of sentence types used by the writer, identifying the order and/or grouping of those sentence types, comparing the identified order and/or grouping to a predetermined selection of superior orders or groupings, and providing improvements based on identified order and/or grouping not identified. The writer is then enabled to improve their writing fluency by use of superior order and/or grouping of sentence types.

Another type of feedback is to direct the writer to reduce or increase the frequency of sentence types depending on the type of work the writer is hoping to produce. In such embodiments, the method comprises the steps of identifying a selection of sentence types used by the writer, identifying the frequency of those sentence types, comparing the writer's frequency to a predetermined selection of superior frequencies and providing improvements based on frequencies not used by the writer. The writer is then enabled to improve their writing fluency by deploying sentence types may be better suited to the type of work the writer is hoping to produce.

Another type of feedback is to provide visual or textual prompts to the writer as to how their writing may be altered to become more similar to that of a published author or mirror a desired stylistic improvement in their writing: In some embodiments, this is achieved by a comparison of the sentence type and order of sentence types of the writer compared with the same data obtained from a published author of choice. In such embodiments, the method comprises the steps of identifying a selection of sentence types used by the writer, identifying the sentence type and order of those sentence types, comparing the writer's type and order to the type and order of known writer whose work has also been analysed and providing improvements based on types and orders used by the famous writer that the writer is seeking to emulate.

In some embodiments, particular feedback is based on particular criteria of the writer. Particular criteria includes any one or more of the following:

The age of the writer—chronological or developmental.

The aspects of their writing they wish to see improved—that is, they may pre-select an aspect such as clarity, or structure, or voice that they wish to improve and receive feedback on these aspects instead of others.

The desires of the educator/teacher—the feedback type may be set by the teacher who also has access to the software In some embodiments, the type of feedback may be established by the writer's previous work. That is, their pre-existing strengths or weaknesses of writing previously examined and responding to conditions in the writing which may still be existing or may be showing improvement. Therefore, data indicative of historical evaluation is gathered and stored for later recall. In such embodiments, the method comprises the steps of:

establishing the basis for feedback (based on age, writer pre-selection, teacher selected); analysing the writer's previous work and determining the particular sentence types used or not used by the writer; determining the patterns presently used/not used by the writer within that previous work; and determining precision data and paragraph data.

Determining the sentence types, patterns, precision, and paragraph skills that should be in use by a writer of such an age/stage based on comparison to a pre-determined database or list, providing improvements based on types, patterns, precision, and paragraphing not yet employed by the writer.

Figure 7:
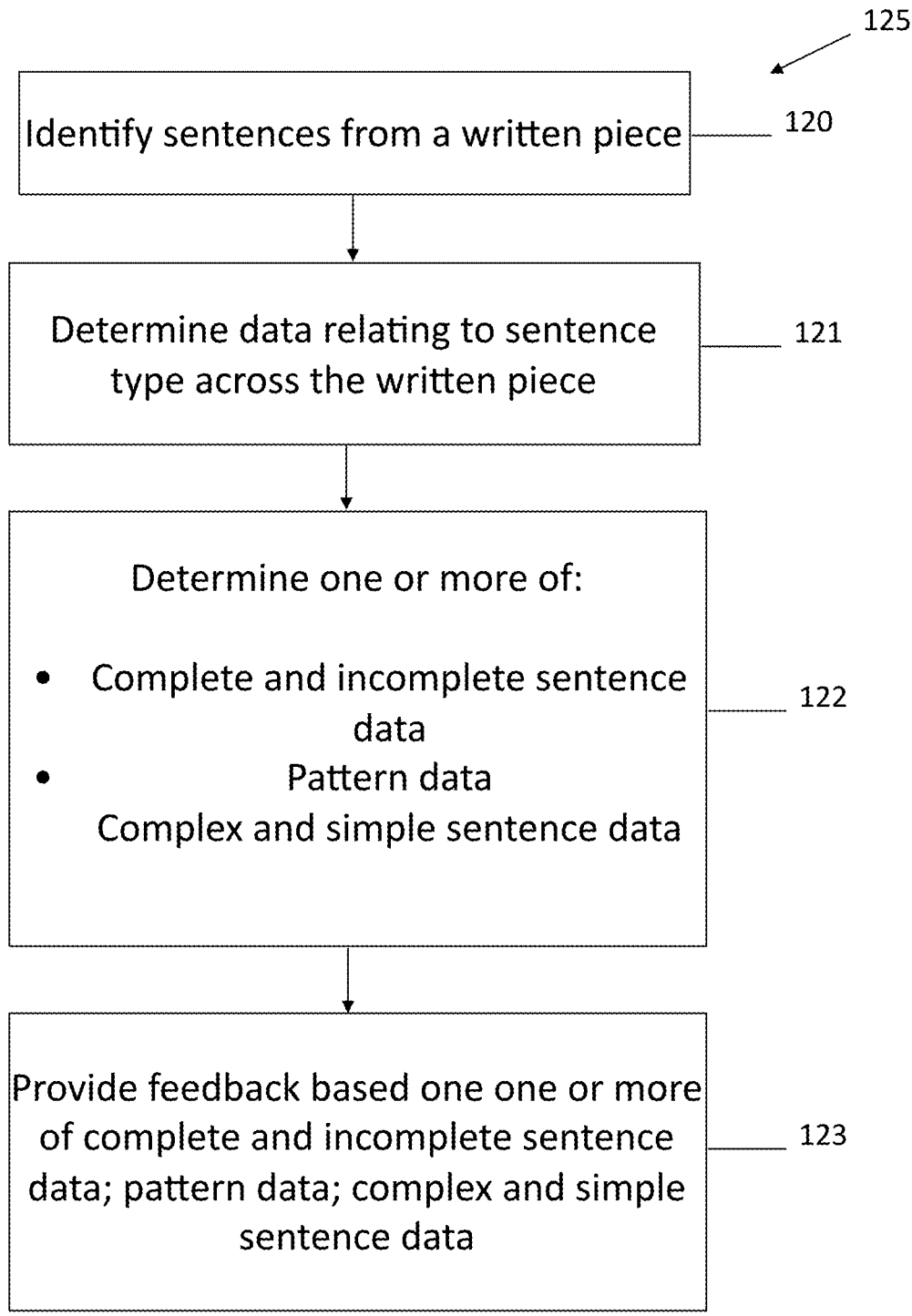
FIG. 7 is a flow diagram of a method for analysing a piece of writing based on sentence type analysis and other features.

FIG. 7 is a flow diagram of a method 125 for analysing a piece of writing and providing feedback to the writer based on that analysis. The method may be used instead of or in combination with the method described above with reference to FIG. 6.

The method includes identification of one or more of:

Complete and incomplete sentence data;

Pattern data;

Complex and simple sentence data;

Precision term data; and/or

Paragraph data.

The following is a description of each of these aspects.

Incomplete and Complete Sentence Types

Incomplete sentences, (see above sentence type nineteen) are able to be identified by the incidence of gross grammatical, tense, voicing, punctuation, syntax, or meaning errors.

The parsing of sentence styles revealing the ratio of complete sentences versus incomplete sentences is beneficial in a number of contexts. At the level of analysing for basic literacy, the ratio of complete versus incomplete sentences is useful for an educator. For example, once the ratio of incomplete to complete sentences exceeds 50 percent, then the student (from a written capacity) is bordering illiterate, and requires in-depth remedial work to aid this difficulty.

Conversely, if a writer delivers an incomplete sentence (that is, a sentence that is grossly grammatically incorrect and because of this meaning is unclear), at a rate of one sentence in 10, then the reader will think that is odd, but will continue to forge ahead in respect of meaning. If the writer does this at the rate of two sentences in ten, then the reader will become concerned.

By the time the writer is delivering incomplete sentences at the rate of three in every ten, the reader is now struggling to comprehend meaning in the wider piece. From this point onwards, should this incidence increase further, the reader will feel a definite sense of unease about the writers ability and by the rate of five in every ten, the reader will have the sense that this writer does not know how to covey themselves in the written word.

Parsing incomplete sentences, then, becomes important for educators to identify the basic literary development of the writer.

Pattern Data

In some embodiments, the patterns of particular sentence types in a written piece are also analysed. Patterns of sentence types deployed by writers reveal information about writer abilities and shortcomings of their expression skills and analytical skills.

Locating patterns in a writer's work allows adjustments can be recommended to improve the writer's ability to express themselves. For example, the following patterns in an eight-sentence paragraph indicate weak patterns—where the writer has limited communicative ability.

Simple, Simple, Simple, Simple, Simple, Simple, Simple, Simple.

Simple, Adverb, Simple, Simple, Simple, Simple, Simple, Adverb.

Preposition, Preposition, Ed-start, Ed-start, Simple, Simple, Simple, Simple

Similarly, any of the following sentence patterns demonstrate flaws in writing skill. The patterns, regardless of the words the writer use, will appear dull and repetitive to read.

Adverb, Simple, Simple, Adverb, Adverb, Simple.

Simple, Preposition, Preposition, Preposition, Ed-start, Simple.

Very Short, Very Short, Very Short, Very Short, Very Short, Very Short.

Ing start, ing start, ing start, Preposition, Preposition, Simple.

Ing start, preposition, ing start, simple, preposition, simple.

Simple, Developmental flow-on sentence, Developmental flow-on sentence, Ed-start, Ed-start.

Many other combinations are possible.

Conversely, the following are all examples of stronger patterns of sentence types. When employed by a writer, they demonstrate more vigorous writing. The deployment and pattern of these sentence types, once injected with content, will deliver vigorous writing on an issue, and the writer will demonstrate they are analyzing their material in a thoughtful manner.

Simple, Adverb, W-start sentence, Explore the Subject, Very Short, ing-start, Simple, Very Short.

Adverb, W-Start, Simple, Adverb, Very Short, Simple, Simple, Very Short.

Very Short, Preposition, Adverb, Explore the Subject, Simple, Explore the subject.

Simple, Very Short, W-start, Conjunction Start, Explore the subject, Very short sentence.

Question sentence, Adverb, Preposition, Simple, Simple, Conjunction, Simple.

Ed-start, Very short, explore the subject, Conjunction, Preposition, Simple, Simple.

Weak patterns can exist due to a number of criteria: the repetition of particular sentence types is indicative of a weak pattern. In this, some sentence types are more robust to repetition, others, such as -ING are not. Weak patterns can also exist from placing too many sentence types of the same type in succession. Weak patterns can also exist from placing sentence types together that have conflicting rhythmical patterns. Weak patterns can also exist from placing some sentence types within too close proximity of each other. For example, Developmental Flow on and ING start too close together will appear clumsy expression.

Conflicting rhythmical patterns occur when sentence types that are either too similar in nature are placed too close together in tandem or in multiples, or in sequences where the types are too similar to warrant an improvement in the fluency of the writing. The result is that the writing appears clumsy and dull. Two explore the subject sentence types followed by an em-dash sentence type is one such example. The rhythmical structure of the sentences is too similar to deliver sufficient improvement in the writing, and instead, the pattern will labour the reader. Two ed-start sentence types followed by an ing-start sentence type is a further example of such a conflict.

Conflicting rhythmical patterns can also occur when the sentence types used are at odds with the style of writing being considered. For example, if the writer was writing a portion designed to indicate dramatic action and had chosen to use an -ing start sentence type and developmental flow on sentence type. Again, the piece would labour as these sentence types are not conducive to dramatic writing.

The following list gives the maximum number of times a writer may repeat a sentence type in succession (repetition tolerance) before the repetition begins to labour the reader. Improvements may be of the form of directing writers toward alternative types of sentences when sentence types exceed their preferred repetition tolerance.

| | |
|---|---|
| Simple Sentence; | 4 |
| Adverb Sentence; | 2 |
| Preposition Sentence; | 2 |
| W-Start Sentence; | 2 |
| Explore the Subject Sentence; | 2 |
| Very Short Sentence; | 3 |
| Em-Dash Sentence; | 2 |
| Ing-Start Sentence; | 1 |
| Ed-Start Sentence; | 2 |
| Serial comma (Red, White, and Blue); | 1 |
| The Semi-Colon Sentence; | 1 |
| Question Sentence; | 2 |
| Power Sentence; | 2 |
| Conjunction Sentence; | 1 |
| Colon and Flow Sentence; | 1 |
| Emphatic Ending Sentence; | 1 |

-continued

| | |
|---|---|
| Developmental flow-on sentence; | 1 |
| Undefined Sentence; and | 2 |
| Incomplete Sentences. | 1 |

Strong patterns with are those with a certain rhythm. Rhythm is very hard to teach, which is why pattern data can aid feedback. For example, one can write lots of different sentence pattern combinations that will be weaker or stronger—from knowing what the different opening styles do rhythmically together, and whether they clash or are harmonious—from a writing perspective.

In short, you can assemble a series of patterns from very clumsy to moderate, to proficient, to advanced writing. And the writer can be directed to this based on their ability—or the historic way they are already writing or even what they aspire to.

In such embodiments, the method comprises providing feedback to the writer, the feedback based on the pattern type data. Feedback facilitates improvement of the style, the cohesion, the fluency, the strength, the analytical skill, the clarity, and the voice of the writer. Based on the feedback provided to the writer, they are able to adapt their writing to incorporate new arrangements of sentence types and thereby enhance their writing ability. Feedback may comprise one form, or two or more forms.

In some embodiments, the form of such feedback is to provide directions as to pattern amendments. This may be to suggest alterations to existing patterns, insertions of alternative patterns, removal or replacement of sentences, so as to improve a pattern of sentence types being deployed. These particular aspects include clarity, voice, vigour, pace, fluency, cohesion and analytical skill, and may or may not be pre-selected by the writer. They may, for example, be selected by the teacher. Or, be selected from analysis of the writer's writing to date and deciding the most pressing developmental need, which may be done from prioritising aspects of feedback. In such embodiments, the method comprises the steps of identifying the pattern of sentence types used by a writer, identifying where the writer's existing patterns are close to superior patterns or where the writer has been repetitive and the use of superior patterns may assist the writer, provide suggestions as to alternative sentence types to improve the patterns used by the writer. The writer is then enabled to improve the fluency, the strength, the analytical skill, the clarity, and the voice of the work.

In some embodiments, the form of feedback is to offer pattern improvements based on the known writing styles of particular writers or that of writers in particular fields. In such embodiments, the method comprises the steps of identifying the pattern of sentence types used by a guide writer; identifying the pattern of sentence types used by a student writer, and providing suggestions to adapt the pattern of sentence types of the student writer to match the guide writer. The student writer is then enabled to adopt the writing of the guide author.

Another type of feedback is to re-cast or re-write sections and offer these as exemplars for the writer of enhanced patterns.

Another type of feedback would be to use pattern data to isolate areas for remedial work by the writer and areas of stronger work, thus providing passive feedback on quality. In such embodiments, the method comprises the steps of identifying the pattern of sentence types used by a writer, identifying where the writer's existing patterns are strong, identifying where the writer's existing patterns are weak; and providing an indication of those weak patterns.

Another type of feedback may be to assign pattern data numerical values, and offer the writer a score or numerical value based on their writing style and patterns. Such a scale may be used to indicate proficiency of the writer, and areas of strength or weakness compared to existing work or to other writers.

To provide feedback best suited to the writer of a written piece under analysis, particular criteria should be met. Criteria includes one or more of the following:

The age of the writer-either chronological or developmental as a writer.

The aspects of their writing they wish to see improved—that is, they may pre-select an aspect such as clarity, or structure, or voice that they wish to improve and receive feedback on these aspects instead of others.

The desires of the educator/teacher—the feedback type may be set by the teacher who also has access to the software.

The type of feedback may be established by the writer's previous work. That is, their pre-existing strengths or weaknesses of writing previously examined and responding to conditions in the writing which may still be existing or may be showing improvement. Accordingly, in some embodiments, the system is configured to allow entry and storage of data indicative of pre-existing strengths and weaknesses and/or track progress based on previous written work processed by the system. For example, the system is configured to store data according to individual writers whose work has been analysed. The data may represent parameters such as range of the sentence types used, the frequency of sentence types used and/or one or more parameters representing the order or sequence of any or all sentence types used.

The system is preferably configured to present feedback in a prioritised manner. In an example, the type of feedback is decided by a predetermined rank order list, by which an order of writing skills is held, and the areas a writer needs to improve first are suggested, with more demanding skills held until earlier ones are mastered. The list may be stored in memory and the order of feedback determined by a skilled writer or educator. The list may be predetermined, or based on historic data from the writer. In an example, the order list is based on the weakest areas identified ordered first in the list.

Identifying patterns in sentence type delivery allows the writer to be guided from deployment of ineffective patterns to write with more effective patterns. Pattern analysis can be used to identify stronger passages in a piece of writing as well as weaker passages, and from this deduction to make suggestions as to writing improvement.

Pattern data may be represented in different ways. Using simple descriptors, pattern data may be represented by sentence type sequences (as presented above). Equally, pattern data may be represented graphically and FIG. 9 demonstrates this. Simple graphical symbols have been used to identify the sentence types. The first representation is of an eight-sentence paragraph containing simple sentences. The single line represents the simple sentence, and the length of the line corresponds to the length of the sentence. This is a weak pattern.

Figures 9, 10:
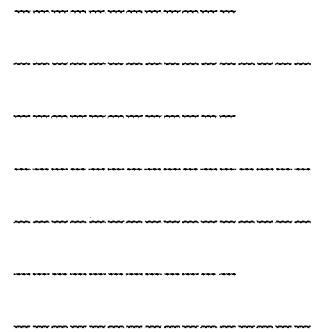
FIG. 9 shows a first sentence type pattern.
FIG. 10 shows a second sentence type pattern.

The next example, is shown in FIG. 10, using symbols, represents a stronger seven sentence pattern. This writer displays greater fluency and it is immediately evident by the pattern. The pattern is: Power, Ing, Adverb, Very Short, Explore the subject, Simple, Simple, Very Short. In fact, this pattern is the paragraph preceding this one.

Illustrative symbols denoting sentence types are exemplified in FIG. 11.

Pattern data, either graphically or in words, can assist the educator deduce writing strengths and weaknesses in students and offer remedial suggestions.

Analysing for sentence types and patterns tells the educator both the capacity of the student and is an indicator of their developmental stage in literacy.

Sentence Length (compared with sentence type for pattern development)

Some methods in the prior art have suggested varying sentence length to improve writing quality. At first glance, this sounds meaningful. It is not. Varying sentence length alone without first addressing an improvement in the deployment of sentence types, and then the patterning of those sentences, will not give the user a meaningful difference. Sentence length variation becomes a more important influence on writing quality, once sentence type improvement has taken place.

For example, some patterns are robust even when the sentences are of similar sentence length and will command the reader's interest in the material being presented. The following is one example: Simple, Adverb, W-start, Preposition, Simple.

In contrast, many of the patterns listed under weaker patterns above are not remedied by varying sentence length. The writing will already appear deficient because of the limited use of varying sentence types on display and the weaker pattern employed. For example, the following pattern remains weaker even when varying sentence length: Ing, ed start, preposition, simple.

The pattern shown in FIG. 12 may also be represented graphically. Here the utility of also pattern data is also evident. The similarity of symbols clustered together [the squares] as the sentences advance is indicative of the repetitive nature of the sentence rhythm and its inherent weakness as a passage. That is, sentence types with similar rhythmical patterns are denoted with similar symbols. Clustering types together of too many like symbols, dulls writing.

Identifying the sentence typology, and analysing for patterns in the sentence, student writing can be analysed and the writer's ability level isolated.

Areas of strength and weakness in their writing capacity can be determined. And, ways to improve the fluency, patterning, expression of their writing deduced and offered.

This can be at the level of analysing an entire cohort of students—or at the level of the individual student and the individual piece of writing. Suggestions may be made to improve patterns, or introduce sentence types that the writer has not considered or is not employing.

Ratios Between Simple Sentence Types and all Other Sentence Types

In some embodiments, the method comprises determining the ratios between sentence types used by a student, and feedback is provided to the student based on that analysis. For example, at a base level, the ratio between simple sentence types and all other sentence types is indicative of the basic fluency capacity of a writer. Untrained writers will often write at ratios of simple sentences to sentences of others types (those provided here) of 50 percent of the simple sentence type; 50 percent other sentence types.

With reference to the nineteen sentence types identified above, simple sentence types consist of simple and compound sentences. The remaining sentence types are generally considered more sophisticated sentences and herein referred to as merely being all other sentence types.

Typology of sentences also contains punctuation information. That is, to be able to write some of the sentence types demands a greater or lesser command of punctuation skill. More highly-trained writers will lower the ratio of simple to all other sentence types even more and ratios of 20 percent simple to 80 percent all other sentence types are not uncommon. As a result, the voice of the writer has clear characteristics, and their deftness on the page to say what they say is heightened. Accordingly, in some embodiments, the system is configured to detect ratio of simple sentence types to all other sentence types in use, and output feedback based on that ratio. For example, one for of feedback may be a recommendation or a directive to replace one or more simple sentence types in use with a more sophisticated sentence type.

The basic ratio of simple to complex sentence types then is an initial indicator of the writer's capacity and style.

Referring again to FIG. 7, the method 125 comprises steps 120-123 which outline analysis and feedback for a piece of writing based on sentence type data.

At the first step 120: The method comprises identifying sentences from a written piece. The sentences are identified by a text parsing process that those skilled in the art will be familiar with. The parsed text is analysed to identify individual sentences (and paragraphs if desired). As described above, each identified sentence may be recorded in a file on any available storage media and/or tagged with a unique identifier such as an identification code or provided a unique place in a list.

At the second step 121: The method comprises analysing each identified sentence to determine data according to sentence type it conforms to from the set of nineteen particular sentence types in the above described list. To perform this step, each of the identified sentences are analysed to determine the particular words and characters used. Each sentence type is characterised by the presence or absence of particular words and/or characters, and the position of those words and/or characters. Any number of conditional statements may be applied to each identified sentence in order to determine the sentence type that best fits with each identified sentence.

At the third step 122, the method comprises is configured to determine one or more of a number of characteristics including: complete and incomplete sentence data; pattern data; complex and all other sentence type sentence data.

Complete and incomplete sentence type data comprises determining a ratio between complete and incomplete sentences. Incomplete sentences are those as defined as sentence type nineteen in the list of sentence types, whereas complete sentences are any other of the nineteen sentence types. Following determination of this ratio, the system is configured to output one or more responses as feedback step 123. For example, one response is a numerical indication of the level of literacy of the writer. Another response is a notification of one or more of any incomplete sentences identified so that the writer enabled to make corrections. The ratio may further be stored in memory for later retrieval as a way to monitor the development of a writer.

Complex and all other sentence data comprises determination of a ratio between simple sentence types and all other sentence types in use, noting that the sentence types constitute one of the nineteen types identified at step 121, and that each of the nineteen sentence types may be considered either a simple sentence type or all of the other sentence types. The ratio is determined by summing the number of sentence types identified that are not incomplete sentences and dividing by number of incomplete sentence types determined. At the fourth feedback step 123, the method comprises providing feedback to the writer based on the determined ratio. One example of feedback is a numerical indication of the level of literacy of the writer. Another response is a notification of one or more of any incomplete sentences identified such that the writer is able make corrections. The ratio may further be stored in memory for later retrieval as a way to monitor the development of a writer. A further form of feedback is a recommendation of non-complex sentence types, which are not in use, to the writer. This promotes a natural writing development path.

In some embodiments, the computer system is configured to store demographic data relating to the writer, such as age and academic level. Sentences types determined to not be in use are recommended to the writer based on the writer demographic. For example, early development writers may be best recommended less demanding sentence types. Where a writer has an advanced academic level, more demanding and sophisticated sentence types not in use may best be recommended.

Pattern data comprises the sequence and repetition of sentence types used by the writer. Preferably, the system is configured to output a form of feedback to the writer at step 123 based on the sequence of sentence types deployed. For example, the system may be configured to output a form of feedback to the writer suggesting unused sentence types to be employed in a sequence of sentences, sentence types that could be used more often and/or sentence types that form sub patterns or patterns representing a rhythmic deployment. Preferably, the method comprises outputting a form of feedback identifying the sequence of sentence types in use in a passage of writing and optionally, an improved sequence of sentence types.

Precision Terms

In some embodiments, the precision terms used by a writer are also analysed. When precision term analysis is added to sentence type and sentence type pattern data, the insights about a writer's capability become greater again.

Precision terms are defined as actual names, dates, statistics, amounts, events, places, people, things, including subject terminology. Accordingly, a writer can increase their precision by the use of more of such terms.

A precise writer (Writer A) may pen:

"War broke out in Korea on 25 Jun. 1950. Overrun by superior Communist forces, within six weeks South Korea's beleaguered army were entrapped on the Pusan Perimeter. South Korean forces which numbered 95,000 troops when the conflict began, were already less than 20,000. If the United States did not intervene and immediately send in garrisons from Japan, South Korea would become yet another Communist country. Congress had days to decide."

The first sentence has two instances of precision terms in use: Korea and 25 Jun. 1950. The second sentence has four instances: Communist forces, six weeks, South Korea's and Pusan Perimeter. And so on.

An imprecise writer (Writer B) on the same topic will pen:

"War soon began. The defending troops were quickly overrun by superior numbers and it looked like it would be a rapid victory for the attackers as they trapped the defending troops way down at the tip of the country."

Here, none of the sentences have any instance of precision terms in use. And the result is a vagueness and superficiality in the writing. Combined with this, the writer is not able to say insightful things about what they are discussing for they lack concrete evidence on which to base claims.

Use of precision terms is important in both fiction and non-fiction writing. Precision terms, when combined with sentence typology and patterning, gives writing vigour and depth. Consider the following passage:

"War broke out in Korea on 25 Jun. 1950. Overrun by superior Communist forces, within six weeks South Korea's beleaguered army were entrapped on the Pusan Perimeter. South Korean forces, which numbered 95,000 troops when the conflict began, were already less than 20,000. If the United States did not intervene and immediately send in garrisons from Japan, South Korea would become yet another Communist country. Congress had days to decide."

Here, precision may be illustrated thus, with the number following each sentence type as the number of precise elements contained in that sentence: Power sentence, 2; Ed-start, 4; Explore the subject, 3; Prepositional start, 4, Very Short, 1.

Compared to this example with the sentence types as follows: Very short sentence, 0; Simple, 0, Simple, 0, Simple, 1, Power, 0: "War soon began. The defending troops were quickly overrun by superior numbers and it looked like it would be a rapid victory for the attackers as they trapped the defending troops way down at the tip of the country. There was no way they could defend against such superior numbers and the defending forces quickly lost their military strength. Everyone knew that if the United States did not come to their aid the country would soon be lost. The government had to make their mind up quickly."

In the latter example, precision terms only occur in one sentence of the five given. Even though the writer has used three different sentence types, the low use of precision terms has reduced the writing to dull and insipid. More importantly, Writer B is unable to say anything insightful about their topic, because they have written in this manner. Similarly, if they attempted to make a deduction based on what they had written (as Writer A does in their final sentence) it would sound contrived and disconnected, without substance. The reason for this, is the lack of precision in the work.

Precision Density and Rate

Once precision terms are identified in a work, the terms can be analysed in further ways mathematically, such as the density of precision, and the rate of precision.

Density of precision can be defined as the number of precision units per number of words being analysed (such as a paragraph or similar unit of text).

Rate of precision can be defined as the number of sentences containing precision elements/number of sentences in the unit being analysed.

For the above two pieces therefore:
Example A has precision density of: 22/70 or 0.31
And Rate of Precision of: 5/5 or 1
Example B has precision density of: 2/87 or 0.02
And Rate of Precision of: 1/5 or 0.2

Precision analysis can then tell you, for example, how well a student is writing both fiction and non-fiction. Accomplished authors of both fiction and non-fiction, will often write with a precision term rate of 0.75 and above.

Equally, published historians and geographers will often write with a precision term rate between 0.9 and 1 (using specific names, dates, places, amounts at some point in every sentence) and a precision term density of around 0.25 to 0.3.

At these ratios sufficient specific material is being discussed that the reader is enjoying writing that is informed, detailed, clear, precise, and vigorous.

Educational utility can be derived from this analysis in other ways. If, for example the student was writing a piece about geography or technology and their precision density was 0.01 and their precision rate 0.1—an educator would immediately know, that regardless of whatever else the writing was deficient in, that student needed to work in a more concentrated fashion using subject specific terminology and referring to precise matters, otherwise their capacity to distil insightful analytical points is withheld.

Conversely, it also works that once precision density gets too high, the writer is merely packing their piece with information and is saying little about that information. So, for example, if that same student of geography had written a piece and the rate of precision was 1 and the precision density across the piece was 0.8. Then, as a reader, you would be struggling to construct depth from the piece. Your impression of the piece would be that the author was telling you lots of information, but is not analysing that information in meaningful ways. If this pattern occurred for longer than a brief paragraph, then you, as a reader, will quickly tire, and the piece would lose interest for you. Analysis would be lacking.

Figure 8:
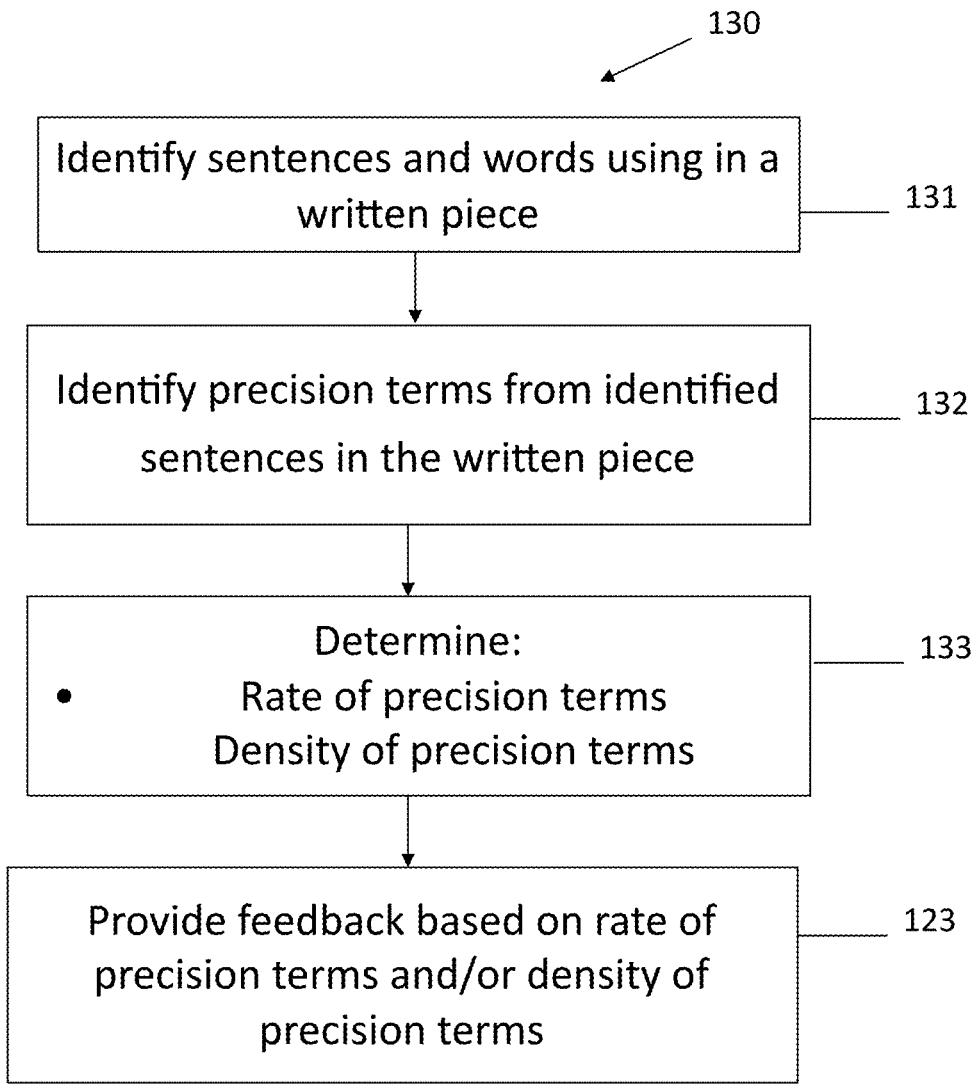
FIG. 8 is a flow diagram of a method for analysing a piece of writing based on precision term analysis.

FIG. 8, shows a method 130 comprises steps 120-123 which outline analysis and feedback for a piece of writing based on sentence type data.

At the first step 131: The method comprises identifying sentences and words in those sentences from a written piece. The sentences are identified by a text parsing process that those skilled in the art will be familiar with. The parsed text is analysed to identify individual sentences (and paragraphs if desired). As described above, each identified sentence may be recorded in a file on any available storage media and/or tagged with a unique identifier such as an identification code or provided a unique place in a list.

At the second step 132: The method comprises identifying precision terms in each identified sentence. A list of precision terms is preferably stored in a database. The precision terms used in each sentence are identified by comparing each word to the list of words in the database. When a match is determined between a word used in the written piece and a word in the database, the use of a precision term is recorded against that sentence. Use may be identified by a visual indicator such as a flag.

At the third step 133: The method comprises determining a measure of either the rate of precision terms, or the density of precision terms, or both. It is envisaged that the writer may select their preference by selection of a virtual button provided on a software display interface.

At the fourth step 134: The method comprises providing feedback to the writer based on the measure of the rate of precision terms and/or the density of precision terms. In one form, the feedback comprises identification of sentences that do not feature a precision term.

In another form, the feedback comprises output of the measure of rate of precision terms, or the density of precision terms, or both. In another form, the measure of the rate of precision terms and/or the density of precision terms are compared to a threshold, and feedback is provided only when that threshold is surpassed.

The determined measure of the rate of precision terms and/or the density of precision terms may be recorded against a particular writer for historical comparison. In this way, the development of a writer can be monitored over time.

In some embodiments, two parameters are identified in a first data aggregation process. These parameters are the incidence of precision terms (described below), and the length of each identified sentence. For each identified sentence, or a subset of identified sentences, a sentence can be determined to be too long based on these parameters. Feedback can be provided to the writer indicating a sentence may be too long if a word count threshold is exceeded. In some varied embodiments, the threshold depends on whether or not precision terms have been used in the sentence.

Application to Paragraphs

All the above analysis may be applied to sections of pieces as well as whole pieces of writing. It may, for example, be usefully applied to paragraphs within a piece to identify stronger and weaker paragraphs. Paragraphs where the writer needs to be more precise in order to improve their delivery can be isolated; paragraphs where the writer is being too repetitive in their sentence type delivery, and the writer's voice or articulation is being adversely affected can be identified. On this basis, according to some embodiments, the system is configured to direct a writer to remedy particular paragraphs in an individual piece.

The system is configured to implement any one or more of the methods described above with reference to FIGS. 6 to 8. The system may implement each of the methods selectively, as instructed by a user via a user input, or call each method automatically according to a predefined sequence or select order of operation. In some embodiments, feedback is in the form of a notification provided to the writer and/or an educator. The notification may be visual. For example, the system is configured to generate an image for display on the display device. Additionally, a table of data may be presented, and/or one or more graphs depicting data determined by the abovementioned processes.

The methods depicted in FIGS. 6 to 8 may also be conducted in the background to other computing tasks such as document preparation and operate as a plugin, pop-up or tooltip. In an exemplary embodiment, one or more of the processes may initiate when a paragraph is detected, perform analysis on the detected paragraph, and provide immediate feedback to the writer. The feedback may relate to one or more aspects of their writing such as the deficient sentence types, lack or precision terms, incomplete sentences, and/or sentence type patterns that could be improved upon.

It will be apparent those skilled in the art that the invention has a range of beneficial applications including providing individual writers with feedback on writing improvement, analysing the writing patterns in educational institutions and from this, deducing required teaching deficiencies, even providing benchmarks for national assessment of student writing ability. Equally, on a broader application, writing strengths and weaknesses in cohorts of students may be usefully identified and remedial paths ascertained.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

The invention claimed is:

1. A system configured to generate and display writer fluency guidance based on a piece of prepared text, the system comprising operating a processor to perform the steps of:
   receiving the piece of text prepared by the writer, wherein the text comprises a plurality of sentences;
   applying a first trained machine learning algorithm to the received sentences to identify each Incomplete sentence style type from complete sentences,
   applying a second trained machine learning algorithm to the identified complete sentences to thereby characterise each sentence as one of a sentence style type from a discrete list of defined sentence style types;
   aggregating a characterisation data set based on the characterised sentence style types;
   generating a display of writer fluency guidance based on the aggregated characterisation data set; and
wherein the discrete list of sentence style types consists in each of:
   Simple Sentence;
   Adverb Sentence;
   Preposition Sentence;
   W-Start Sentence;
   Explore the Subject Sentence;
   Very Short Sentence;
   Em-Dash Sentence;
   Ing-Start Sentence;
   Ed-Start Sentence;
   Serial comma sentence;
   The Semi-Colon Sentence;
   Question Sentence;
   Power Sentence;
   Conjunction Sentence;
   Colon and Flow Sentence;
   Emphatic Ending Sentence;
   Developmental flow-on sentence; and
   Undefined Sentence.

2. The system of claim 1, wherein aggregating the characterisation data set comprises one or more of:
   summing the sentence style types in the written piece;
   determining a ratio between two or more sentence types in use;
   determining a sequence or pattern of two or more sentence types used in the text;
   determining data comparing complete and incomplete sentence types used in the text;
   determining data comparing simple sentence style types to all other sentence types; and/or
   determining the use of precision terms used in one or more sentences.

3. The system of claim 1, wherein the characterisation data set is determined by:
   identification of successive use of a particular sentence type at least three times; and
   controlling the output writer fluency guidance comprises at least one of:
   a visual identification of the repetition, and/or
   providing a selection of sentence types for substitution with at least one of the identified repeated sentence types.

4. The system of claim 1, wherein aggregating a characterisation data set comprises:
   identifying the sentence style types present and absent in the text;
   determining a level of difficulty associated with the absent sentence; and
   controlling the output writer fluency guidance is based on a list of the absent sentence style types as list ordered by the level of difficulty of the absent sentence types.

5. The system of claim 1, wherein aggregating a characterisation data set comprises:
   identifying a selection of sentence types;
   identifying the order and/or grouping of those sentence types in the selection;
   comparing the identified order and/or grouping to a predetermined selection of superior orders or groupings;
   determining at least one absent superior order or grouping; and
   generating characterisation data carrying information of writer fluency measured dependent on the data set comprises at least one absent superior orders or groupings.

6. The system of claim 1, wherein aggregating a characterisation data set comprises:
   identifying a selection of sentence types;
   identifying the frequency of those sentence types;
   comparing the frequency to at least one predetermined superior or reference frequency; and
   generating characterisation data carrying information of writer fluency measured dependent on the data set comprises that frequency.

7. The system of claim 1, wherein aggregating a characterisation data set comprises one or more of:
   identifying a selection of sentence types used by the writer;
   identifying the sentence type and order of those sentence types;
   comparing the type and order to the type and order of a reference text; and generating characterisation data carrying information of writer fluency measured dependent on the data set comprises a comparison of the type and order of the text and reference text.

8. The system of claim 1, wherein aggregating a characterisation data set comprises:
identifying a measure of either the rate of precision terms, or the density of precision terms, or both; and
generating characterisation data carrying information of writer fluency measured dependent on the data set comprises the rate of precision terms and/or the density of precision terms.

9. The system of claim 1, wherein aggregating a characterisation data set comprises one or more of:
display of a fluency chart;
identification of a particular sentence type that has been used successively three or more times; and/or
identification of one or more sentence types that are not used, or least used in the text.

10. The system of claim 1, wherein aggregating a characterisation data set comprises:
determining a ratio of complete sentences to incomplete sentences; and
generating characterisation data carrying information of writer fluency measured dependent on the data set comprises the ratio of complete to incomplete sentences.

11. The system of claim 1, wherein aggregating a characterisation data set comprises:
identifying the sequence of sentence types deployed in the text;
determining the use of the same sentence types above a threshold repetition frequency; and
generating the characterisation data set comprises data indicative of sequential use of same sentence types.

12. The system of claim 11, wherein the threshold for each sentence style type is:

| | |
|---|---|
| Simple Sentence; | 4 |
| Adverb Sentence; | 2 |
| Preposition Sentence; | 2 |
| W-Start Sentence; | 2 |
| Explore the Subject Sentence; | 2 |
| Very Short Sentence; | 3 |
| Em-Dash Sentence; | 2 |
| Ing-Start Sentence; | 1 |
| Ed-Start Sentence; | 2 |
| Serial comma (Red, White, and Blue); | 1 |
| The Semi-Colon Sentence; | 1 |
| Question Sentence; | 2 |
| Power Sentence; | 2 |
| Conjunction Sentence; | 1 |
| Colon and Flow Sentence; | 1 |
| Emphatic Ending Sentence; | 1 |
| Developmental flow-on sentence; | 1 |
| Undefined Sentence; and | 2 |
| Incomplete Sentences. | 1 |

13. The system of claim 1, wherein aggregating a characterisation data set comprises:
identifying one or more sentences absent of precision terms from a predetermined list of precision terms; and
generating the characterisation data set comprises data indicative of the sentences absent of precision terms.

14. The system of claim 1, wherein aggregating a characterisation data set comprises:
aggregating a ratio representing sentences with precisions terms and sentences absent of precision terms;
comparing the ratio to a threshold; and
generating the characterisation data set comprises data indicative of the ratio being below the threshold.

* * * * *